US012615686B2

(12) United States Patent
Wu et al.

(10) Patent No.: US 12,615,686 B2
(45) Date of Patent: Apr. 28, 2026

(54) EARLY DATA COMMUNICATION WITH PRECONFIGURED RESOURCES

(71) Applicant: GOOGLE LLC, Mountain View, CA (US)

(72) Inventors: Chih-Hsiang Wu, Taoyuan City (TW); Jing-Rong Hsieh, Taipei City (TW)

(73) Assignee: GOOGLE LLC, Mountain View, CA (US)

( * ) Notice: Subject to any disclaimer, the term of this patent is extended or adjusted under 35 U.S.C. 154(b) by 304 days.

(21) Appl. No.: 18/038,352

(22) PCT Filed: Dec. 7, 2021

(86) PCT No.: PCT/US2021/062150
§ 371 (c)(1),
(2) Date: May 23, 2023

(87) PCT Pub. No.: WO2022/154903
PCT Pub. Date: Jul. 21, 2022

(65) Prior Publication Data
US 2023/0413372 A1      Dec. 21, 2023

Related U.S. Application Data

(60) Provisional application No. 63/137,280, filed on Jan. 14, 2021.

(51) Int. Cl.
*H04W 76/19* (2018.01)
*H04W 76/27* (2018.01)
(Continued)

(52) U.S. Cl.
CPC ........... *H04W 76/27* (2018.02); *H04W 76/19* (2018.02); *H04W 74/0833* (2013.01); *H04W 74/0836* (2024.01)

(58) Field of Classification Search
CPC . H04W 76/27; H04W 76/19; H04W 74/0833; H04W 74/0836; H04W 76/30; H04W 88/085
See application file for complete search history.

(56) References Cited

U.S. PATENT DOCUMENTS

2021/0136860 A1      5/2021 Phuyal et al.
2022/0167457 A1*     5/2022 Bhatoolaul ........... H04W 76/27
(Continued)

FOREIGN PATENT DOCUMENTS

DE      10 2021 119772 A1    2/2022
WO      WO-2020165148 A1     8/2020
(Continued)

OTHER PUBLICATIONS

3GPP (3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, 3GPP TS 36.300 V16.4.0 Jan. 7, 2021 (Jan. 7, 2021).*
(Continued)

*Primary Examiner* — Lakeram Jangbahadur
(74) *Attorney, Agent, or Firm* — MARSHALL, GERSTEIN & BORUN LLP

(57) ABSTRACT

To process early data transmissions from a UE, a distributed unit (DU) of a base station transmits, by processing hardware, a preconfigured uplink resource (PUR) configuration to the UE in a release message that instructs the UE to transition to an inactive state (610). While the UE is in the inactive state, the DU receives, by the processing hardware from the UE, a data packet via a PUR resource configured in the PUR configuration (612).

16 Claims, 19 Drawing Sheets

(51) Int. Cl.
  *H04W 74/0833* (2024.01)
  *H04W 74/0836* (2024.01)

(56) References Cited

U.S. PATENT DOCUMENTS

| | | | | |
|---|---|---|---|---|
| 2022/0232594 | A1* | 7/2022 | Park | H04L 5/001 |
| 2022/0330374 | A1* | 10/2022 | Kim | H04W 76/20 |
| 2023/0199900 | A1* | 6/2023 | Park | H04W 72/21 |
| | | | | 370/329 |
| 2023/0379880 | A1* | 11/2023 | Park | H04W 68/02 |

FOREIGN PATENT DOCUMENTS

| | | | |
|---|---|---|---|
| WO | WO-2020226400 | A1 | 11/2020 |
| WO | WO-2021/062733 | A1 | 4/2021 |
| WO | WO-2022/031704 | A1 | 2/2022 |
| WO | WO-2022/031980 | A1 | 2/2022 |
| WO | WO-2022/047391 | A1 | 3/2022 |
| WO | WO-2022/075612 | A1 | 4/2022 |
| WO | WO-2022/087275 | A1 | 4/2022 |
| WO | WO-2022/147289 | A2 | 7/2022 |

OTHER PUBLICATIONS

3GPP470 (3rd Generation Partnership Project; Technical Specification Group Radio Access Network; W1 interface; General aspects and principles 3GPP TS 37.470 V16.2.0 (Jul. 2020).*

"3rd Generation Partnership Project; Technical Specification Group Radio Access Network; Evolved Universal Terrestrial Radio Access (E-UTRA) and Evolved Universal Terrestrial Radio Access Network (E-TURN); Overall Description; Stage 2 (Release 16)," 3GPP Standard Technical Specification (Jan. 7, 2021).

"3rd Generation Partnership Project; Technical Specification Group Radio Access Network; Evolved Universal Terrestrial Radio Access (E-UTRA) Radio Resource Control (RRC); Protocol Specification (Release 16)," 3GPP Standard Technical Specification (Jan. 6, 2021).

"3rd Generation Partnership Project; Technical Specification Group Radio Access Network; Evolved Universal Terrestrial Radio Access (E-UTRA); Medium Access Control (MAC) Protocol Specification (Release 16)," 3GPP Standard Technical Specification (Jan. 6, 2021).

"3rd Generation Partnership Project; Technical Specification Group Radio Access Network; W1 Interface; Application Protocol (W1AP) (Release 16)," 3GPP Standard Technical Specification (Oct. 2, 2020).

"3rd Generation Partnership Project; Technical Specification Group Radio Access Network; W1 Interface; General Aspects and Principles (Release 16)," 3GPP Standard Technical Specification (Jul. 17, 2020).

Intel Corporation, "Radio Bearer Configuration for SDT Considering UE Context Relocation and CU/DU Split," 3GPP Draft (Aug. 7, 2020).

International Search Report and Written Opinion for Application No. PCT/US2021/062150, dated Apr. 4, 2022.

Office Action for European Application No. 21831448.2, dated Dec. 3, 2025.

* cited by examiner

104 / 106

200

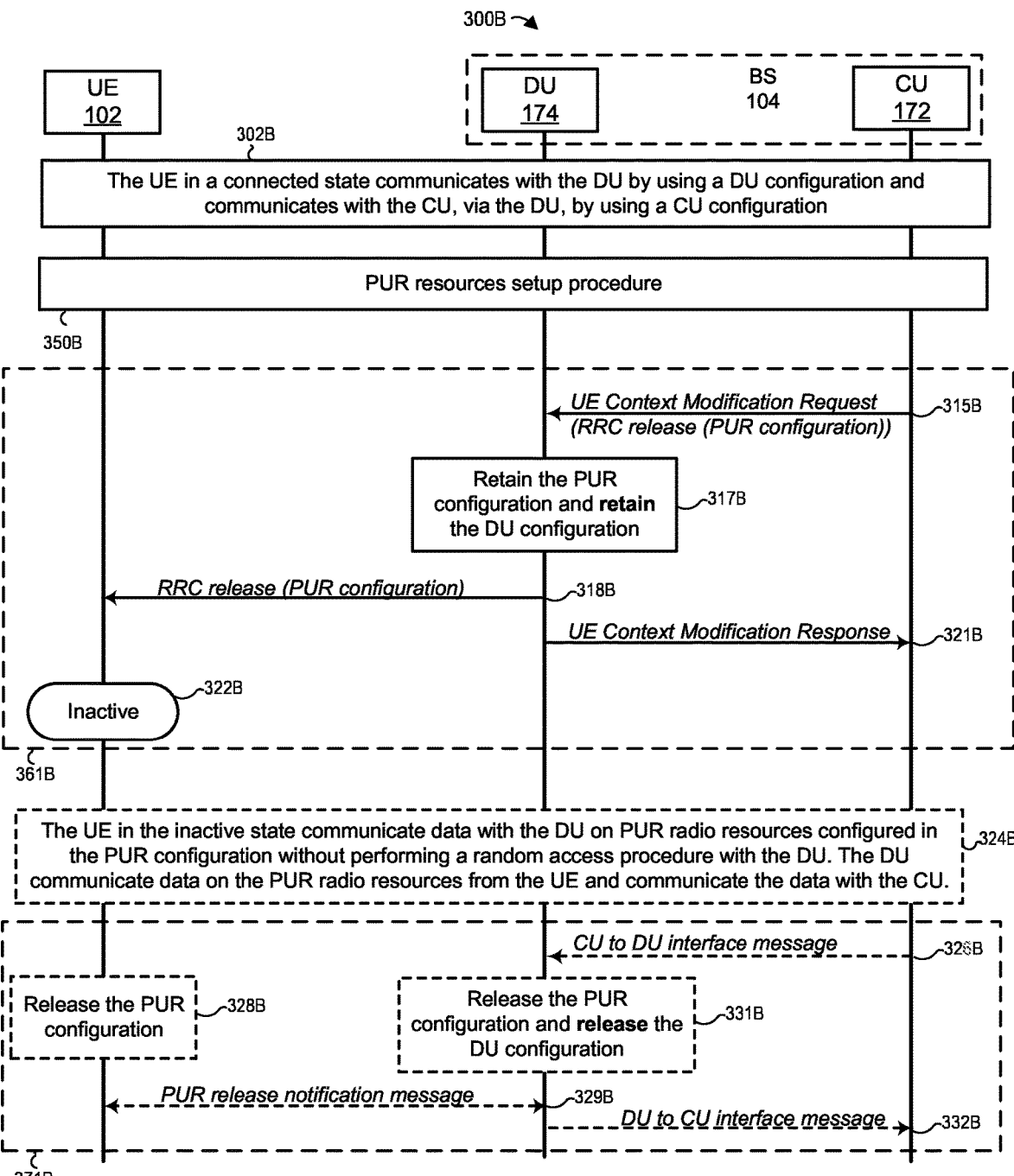

300B

| UE 102 | | DU 174 | BS 104 | CU 172 |

302B

The UE in a connected state communicates with the DU by using a DU configuration and communicates with the CU, via the DU, by using a CU configuration PUR resources setup procedure

350B

UE Context Modification Request (RRC release (PUR configuration)) 315B

Retain the PUR configuration and retain the DU configuration 317B

RRC release (PUR configuration) 318B

UE Context Modification Response 321B

Inactive 322B

361B

The UE in the inactive state communicate data with the DU on PUR radio resources configured in the PUR configuration without performing a random access procedure with the DU. The DU communicate data on the PUR radio resources from the UE and communicate the data with the CU. 324B CU to DU interface message 326B Release the PUR configuration 328B Release the PUR configuration and release the DU configuration 331B PUR release notification message 329B DU to CU interface message 332B

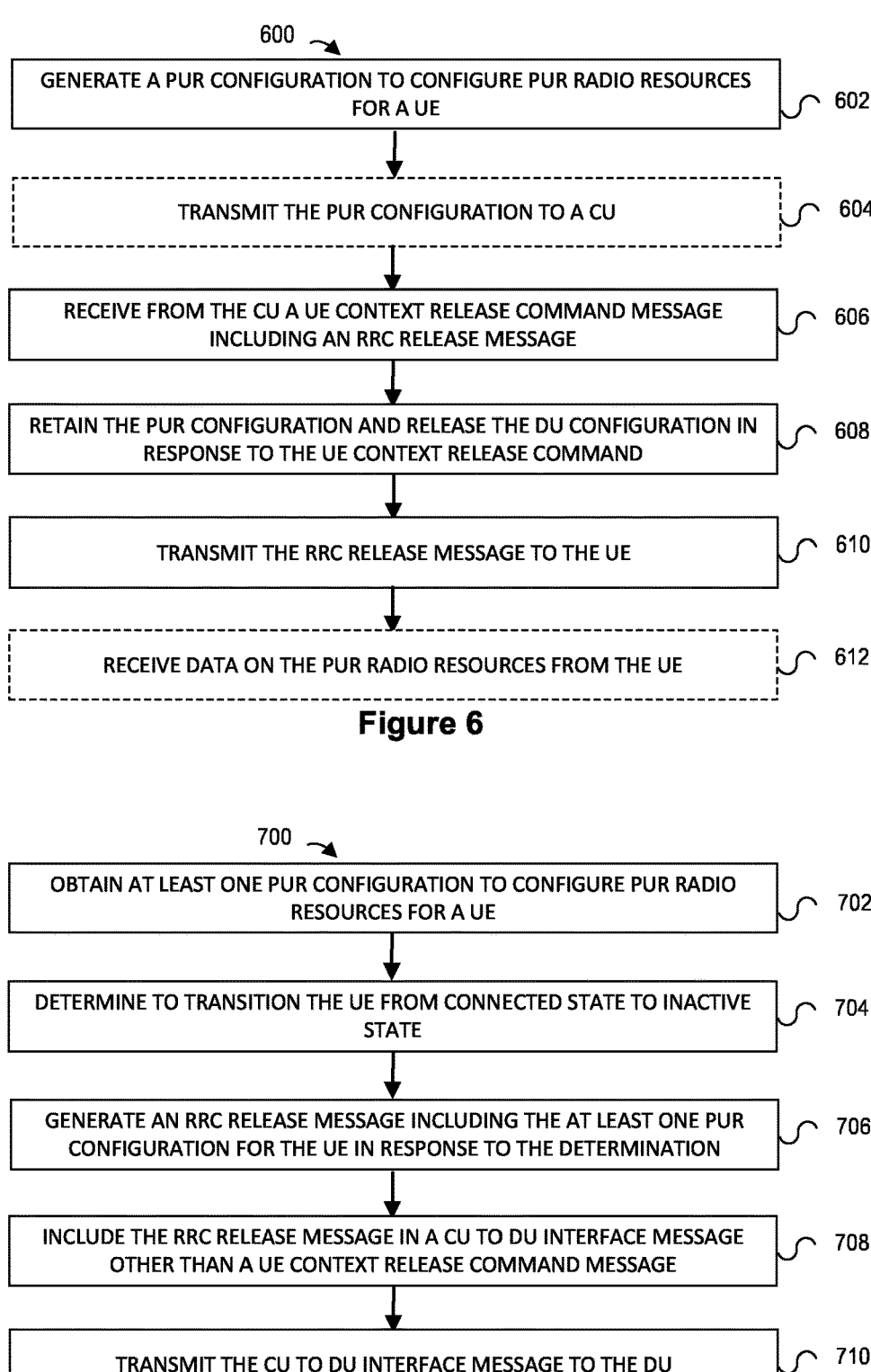

600

| GENERATE A PUR CONFIGURATION TO CONFIGURE PUR RADIO RESOURCES FOR A UE | 602 |

| TRANSMIT THE PUR CONFIGURATION TO A CU | 604 |

| RECEIVE FROM THE CU A UE CONTEXT RELEASE COMMAND MESSAGE INCLUDING AN RRC RELEASE MESSAGE | 606 |

| RETAIN THE PUR CONFIGURATION AND RELEASE THE DU CONFIGURATION IN RESPONSE TO THE UE CONTEXT RELEASE COMMAND | 608 |

| TRANSMIT THE RRC RELEASE MESSAGE TO THE UE | 610 |

| RECEIVE DATA ON THE PUR RADIO RESOURCES FROM THE UE | 612 |

| OBTAIN AT LEAST ONE PUR CONFIGURATION TO CONFIGURE PUR RADIO RESOURCES FOR A UE | 702 |

| DETERMINE TO TRANSITION THE UE FROM CONNECTED STATE TO INACTIVE STATE | 704 |

| GENERATE AN RRC RELEASE MESSAGE INCLUDING THE AT LEAST ONE PUR CONFIGURATION FOR THE UE IN RESPONSE TO THE DETERMINATION | 706 |

| INCLUDE THE RRC RELEASE MESSAGE IN A CU TO DU INTERFACE MESSAGE OTHER THAN A UE CONTEXT RELEASE COMMAND MESSAGE | 708 |

| TRANSMIT THE CU TO DU INTERFACE MESSAGE TO THE DU | 710 |

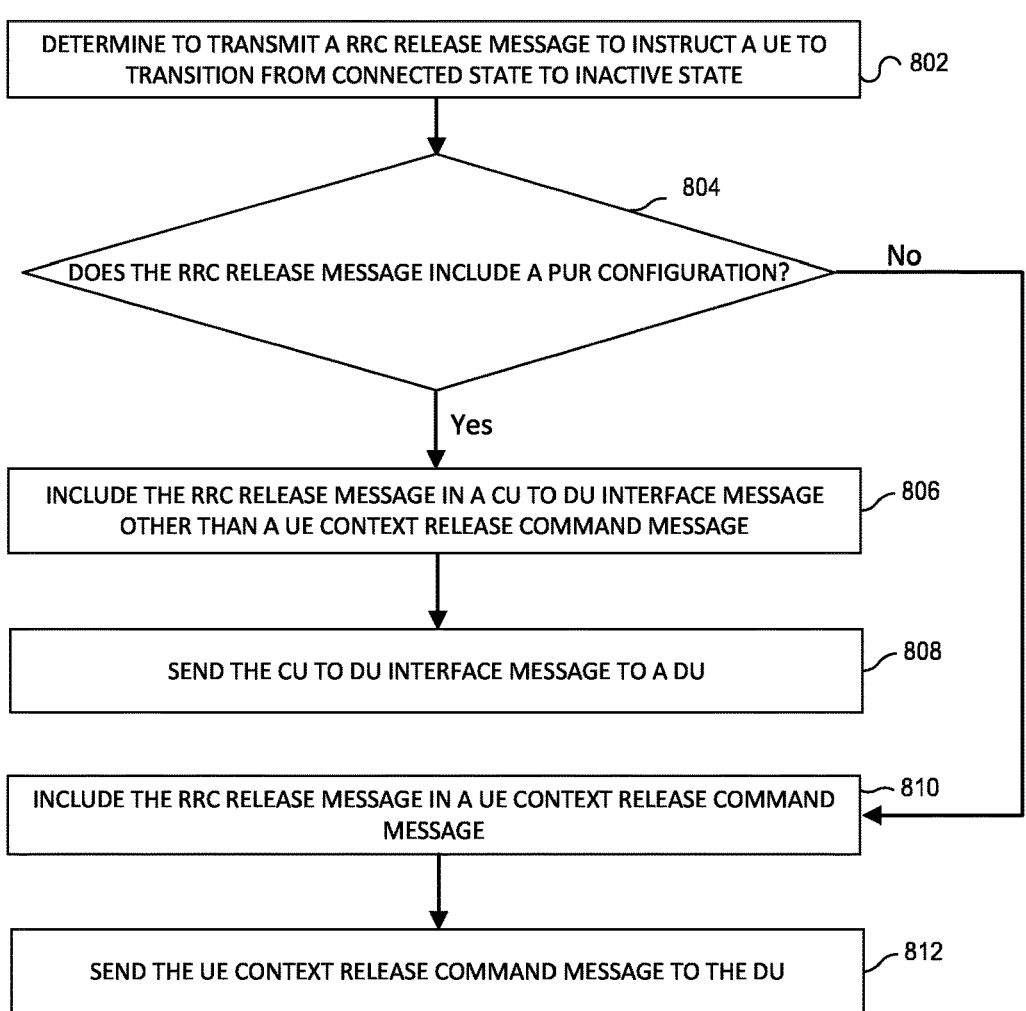

| DETERMINE TO TRANSMIT A RRC RELEASE MESSAGE TO INSTRUCT A UE TO TRANSITION FROM CONNECTED STATE TO INACTIVE STATE | 802 |

804

DOES THE RRC RELEASE MESSAGE INCLUDE A PUR CONFIGURATION?    No

Yes

INCLUDE THE RRC RELEASE MESSAGE IN A CU TO DU INTERFACE MESSAGE OTHER THAN A UE CONTEXT RELEASE COMMAND MESSAGE — 806

SEND THE CU TO DU INTERFACE MESSAGE TO A DU — 808

INCLUDE THE RRC RELEASE MESSAGE IN A UE CONTEXT RELEASE COMMAND MESSAGE — 810

SEND THE UE CONTEXT RELEASE COMMAND MESSAGE TO THE DU — 812

Figure 8

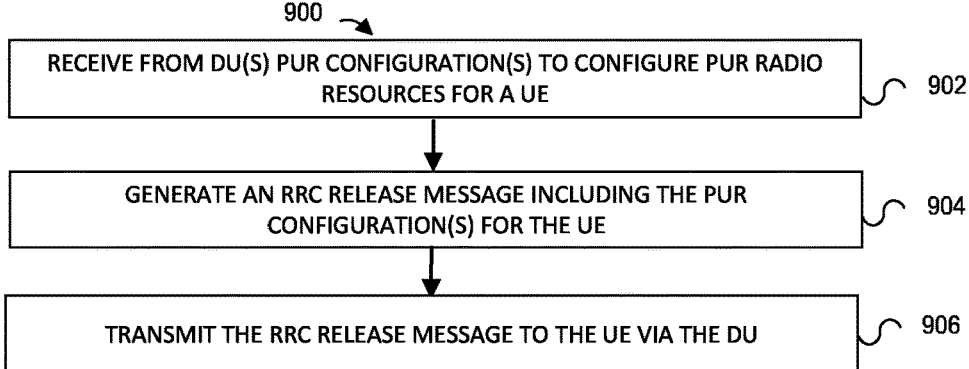

900 ⬋

RECEIVE FROM DU(S) PUR CONFIGURATION(S) TO CONFIGURE PUR RADIO RESOURCES FOR A UE — 902

GENERATE AN RRC RELEASE MESSAGE INCLUDING THE PUR CONFIGURATION(S) FOR THE UE — 904

TRANSMIT THE RRC RELEASE MESSAGE TO THE UE VIA THE DU — 906

Figure 9

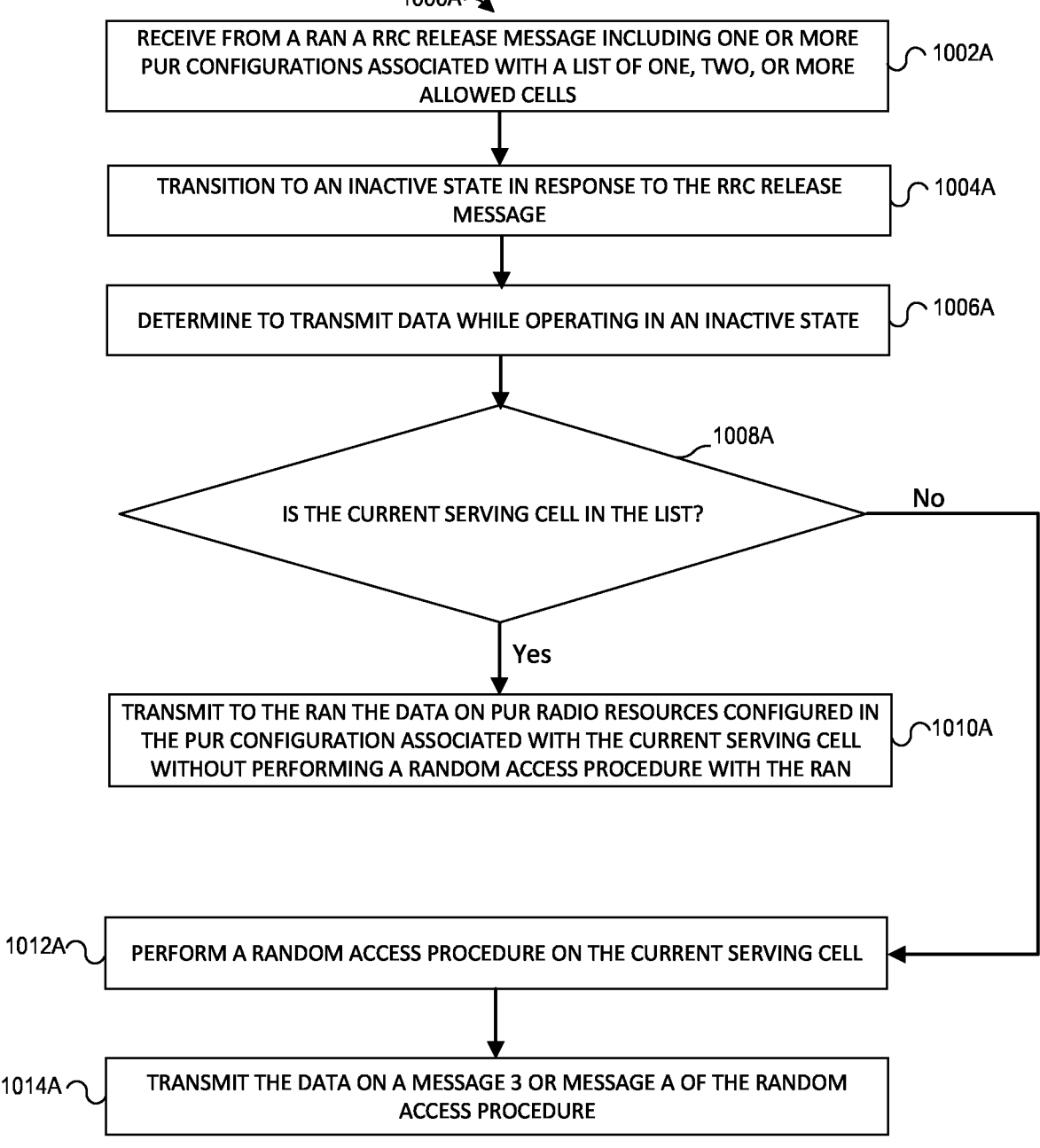

1000A

RECEIVE FROM A RAN A RRC RELEASE MESSAGE INCLUDING ONE OR MORE PUR CONFIGURATIONS ASSOCIATED WITH A LIST OF ONE, TWO, OR MORE ALLOWED CELLS          1002A

TRANSITION TO AN INACTIVE STATE IN RESPONSE TO THE RRC RELEASE MESSAGE          1004A

DETERMINE TO TRANSMIT DATA WHILE OPERATING IN AN INACTIVE STATE          1006A

1008A

IS THE CURRENT SERVING CELL IN THE LIST?          No

Yes

TRANSMIT TO THE RAN THE DATA ON PUR RADIO RESOURCES CONFIGURED IN THE PUR CONFIGURATION ASSOCIATED WITH THE CURRENT SERVING CELL WITHOUT PERFORMING A RANDOM ACCESS PROCEDURE WITH THE RAN          1010A

1012A          PERFORM A RANDOM ACCESS PROCEDURE ON THE CURRENT SERVING CELL

1014A          TRANSMIT THE DATA ON A MESSAGE 3 OR MESSAGE A OF THE RANDOM ACCESS PROCEDURE

Figure 10A

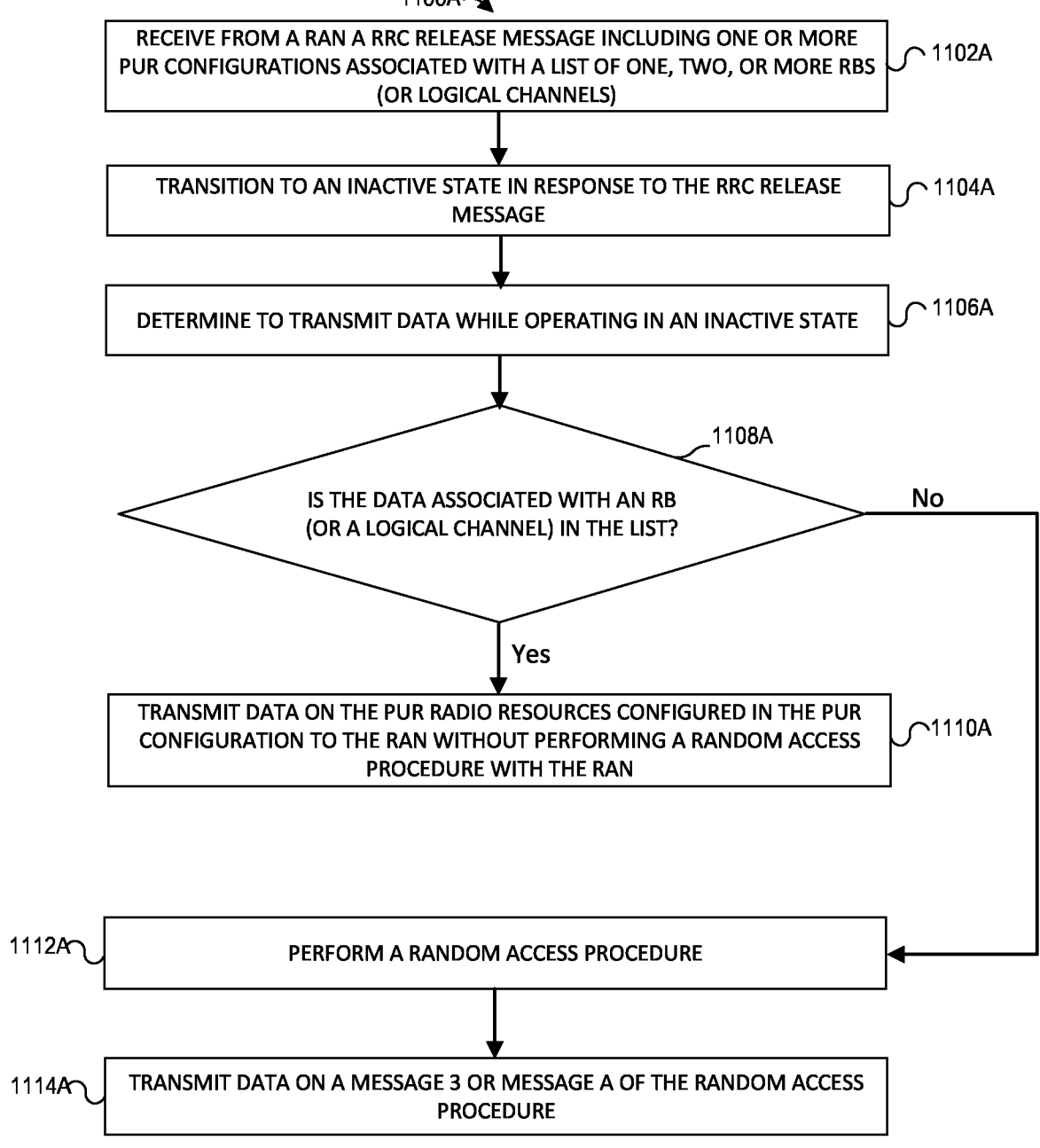

1100A

RECEIVE FROM A RAN A RRC RELEASE MESSAGE INCLUDING ONE OR MORE PUR CONFIGURATIONS ASSOCIATED WITH A LIST OF ONE, TWO, OR MORE RBS (OR LOGICAL CHANNELS) — 1102A

TRANSITION TO AN INACTIVE STATE IN RESPONSE TO THE RRC RELEASE MESSAGE — 1104A

DETERMINE TO TRANSMIT DATA WHILE OPERATING IN AN INACTIVE STATE — 1106A

1108A

IS THE DATA ASSOCIATED WITH AN RB (OR A LOGICAL CHANNEL) IN THE LIST?    No

Yes

TRANSMIT DATA ON THE PUR RADIO RESOURCES CONFIGURED IN THE PUR CONFIGURATION TO THE RAN WITHOUT PERFORMING A RANDOM ACCESS PROCEDURE WITH THE RAN — 1110A

1112A — PERFORM A RANDOM ACCESS PROCEDURE

1114A — TRANSMIT DATA ON A MESSAGE 3 OR MESSAGE A OF THE RANDOM ACCESS PROCEDURE

Figure 11A

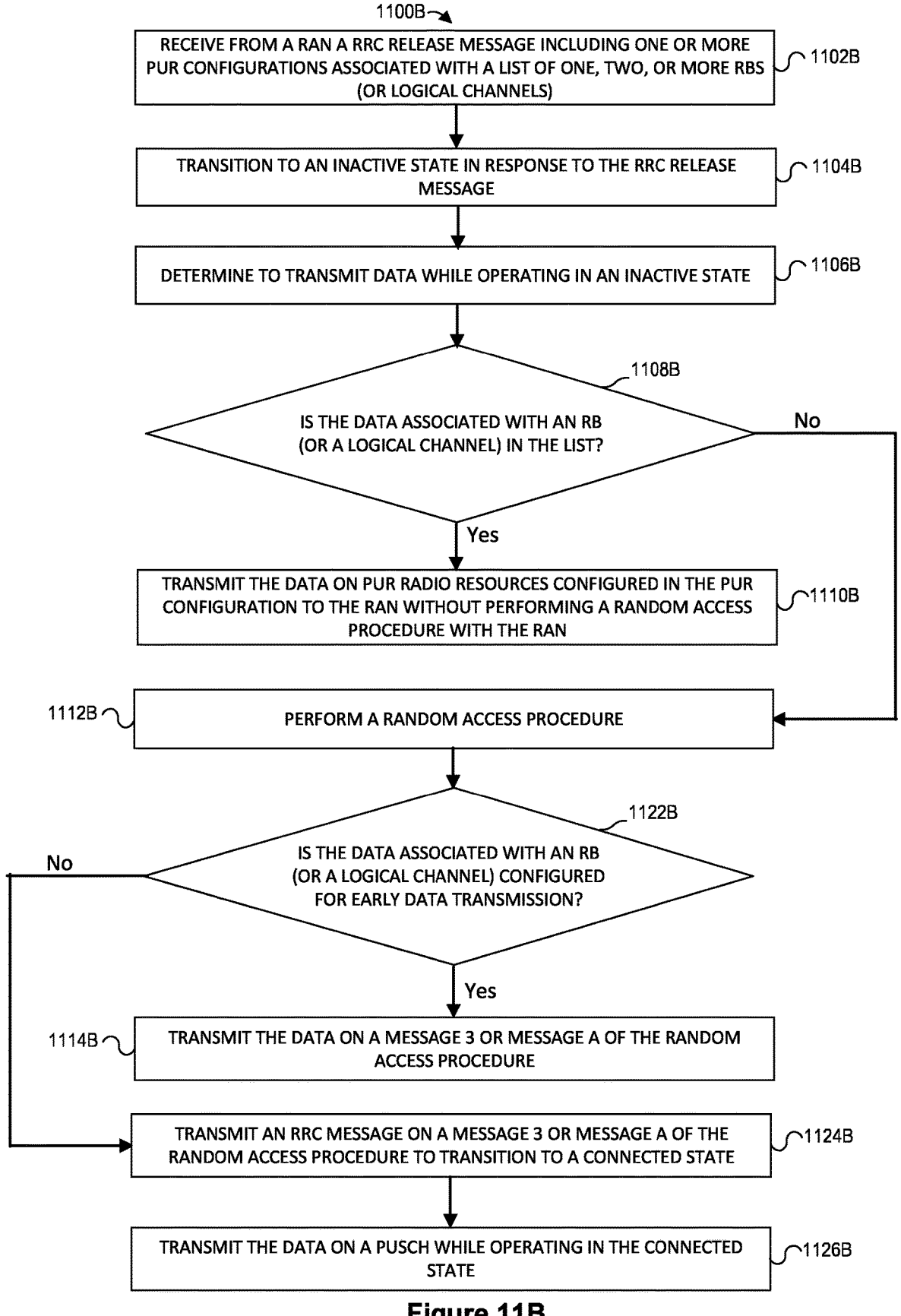

1100B

RECEIVE FROM A RAN A RRC RELEASE MESSAGE INCLUDING ONE OR MORE PUR CONFIGURATIONS ASSOCIATED WITH A LIST OF ONE, TWO, OR MORE RBS (OR LOGICAL CHANNELS)  1102B

TRANSITION TO AN INACTIVE STATE IN RESPONSE TO THE RRC RELEASE MESSAGE  1104B

DETERMINE TO TRANSMIT DATA WHILE OPERATING IN AN INACTIVE STATE  1106B

1108B

IS THE DATA ASSOCIATED WITH AN RB (OR A LOGICAL CHANNEL) IN THE LIST?     No

Yes

TRANSMIT THE DATA ON PUR RADIO RESOURCES CONFIGURED IN THE PUR CONFIGURATION TO THE RAN WITHOUT PERFORMING A RANDOM ACCESS PROCEDURE WITH THE RAN  1110B

1112B  PERFORM A RANDOM ACCESS PROCEDURE

1122B

No     IS THE DATA ASSOCIATED WITH AN RB (OR A LOGICAL CHANNEL) CONFIGURED FOR EARLY DATA TRANSMISSION?

Yes

1114B  TRANSMIT THE DATA ON A MESSAGE 3 OR MESSAGE A OF THE RANDOM ACCESS PROCEDURE

TRANSMIT AN RRC MESSAGE ON A MESSAGE 3 OR MESSAGE A OF THE RANDOM ACCESS PROCEDURE TO TRANSITION TO A CONNECTED STATE  1124B

TRANSMIT THE DATA ON A PUSCH WHILE OPERATING IN THE CONNECTED STATE  1126B

Figure 11B

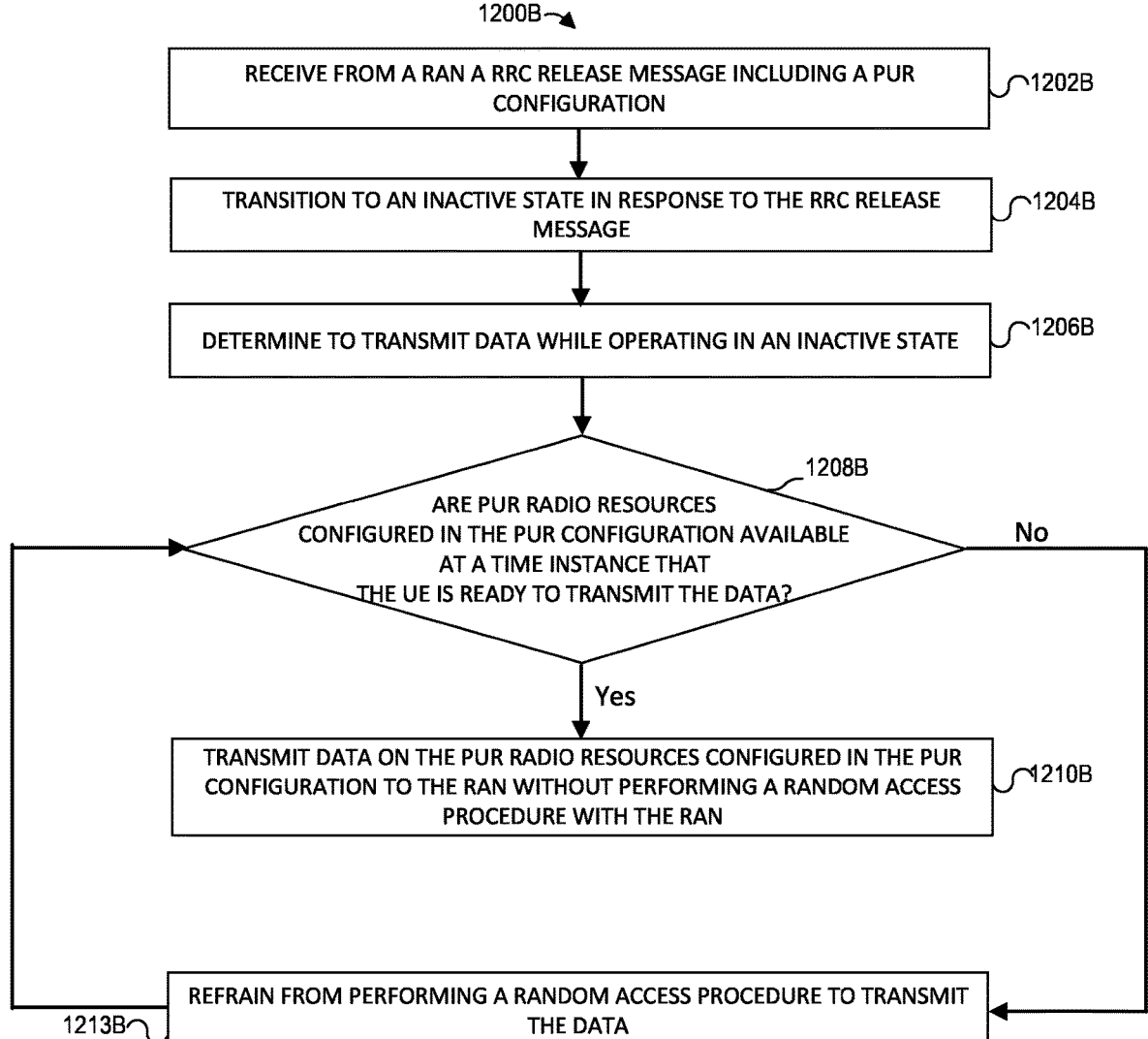

1200B

RECEIVE FROM A RAN A RRC RELEASE MESSAGE INCLUDING A PUR CONFIGURATION — 1202B

TRANSITION TO AN INACTIVE STATE IN RESPONSE TO THE RRC RELEASE MESSAGE — 1204B

DETERMINE TO TRANSMIT DATA WHILE OPERATING IN AN INACTIVE STATE — 1206B

ARE PUR RADIO RESOURCES CONFIGURED IN THE PUR CONFIGURATION AVAILABLE AT A TIME INSTANCE THAT THE UE IS READY TO TRANSMIT THE DATA? — 1208B

No

Yes

TRANSMIT DATA ON THE PUR RADIO RESOURCES CONFIGURED IN THE PUR CONFIGURATION TO THE RAN WITHOUT PERFORMING A RANDOM ACCESS PROCEDURE WITH THE RAN — 1210B

REFRAIN FROM PERFORMING A RANDOM ACCESS PROCEDURE TO TRANSMIT THE DATA — 1213B

Figure 12B

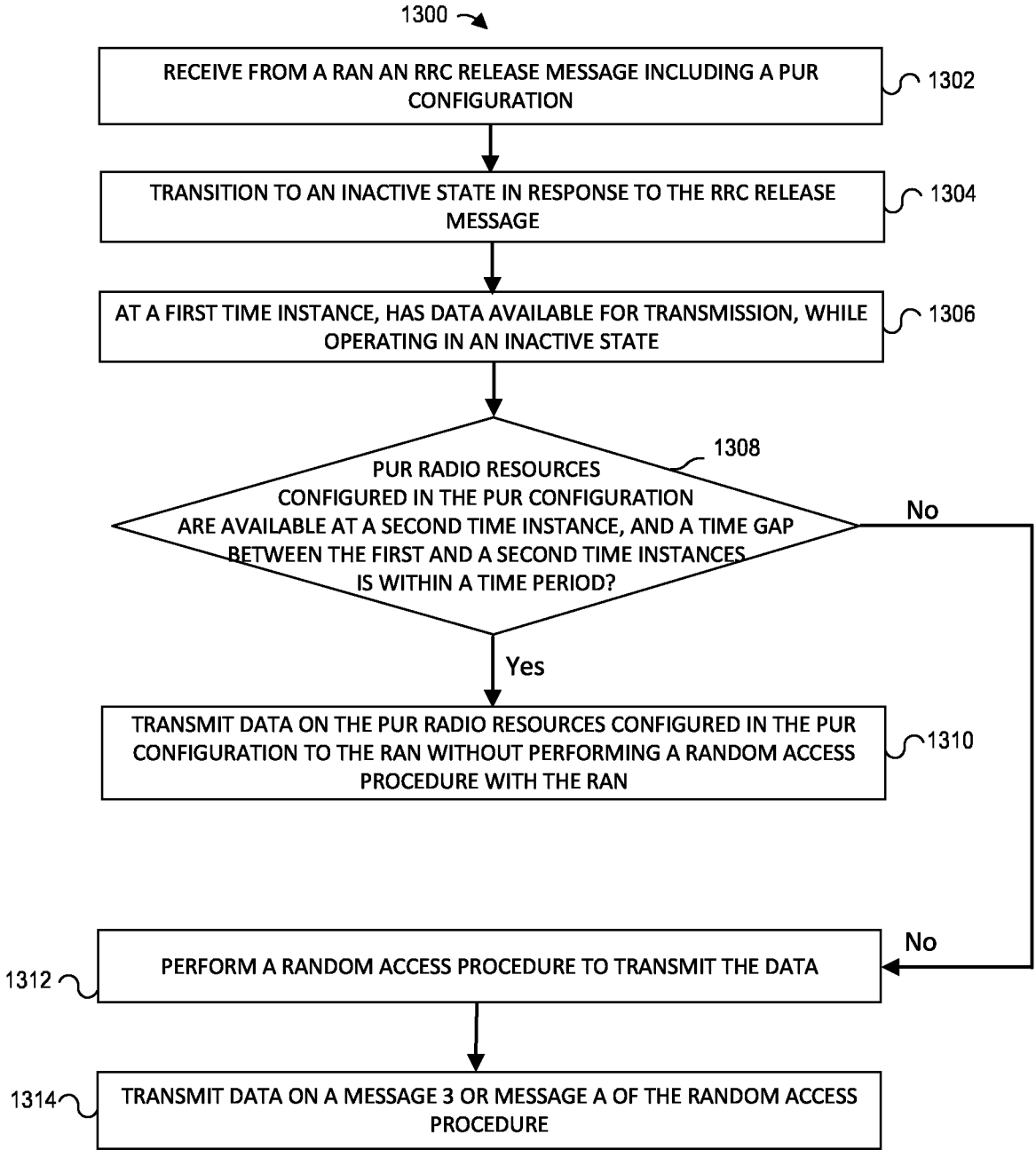

1300

RECEIVE FROM A RAN AN RRC RELEASE MESSAGE INCLUDING A PUR CONFIGURATION — 1302

TRANSITION TO AN INACTIVE STATE IN RESPONSE TO THE RRC RELEASE MESSAGE — 1304

AT A FIRST TIME INSTANCE, HAS DATA AVAILABLE FOR TRANSMISSION, WHILE OPERATING IN AN INACTIVE STATE — 1306

PUR RADIO RESOURCES CONFIGURED IN THE PUR CONFIGURATION ARE AVAILABLE AT A SECOND TIME INSTANCE, AND A TIME GAP BETWEEN THE FIRST AND A SECOND TIME INSTANCES IS WITHIN A TIME PERIOD? — 1308

No

Yes

TRANSMIT DATA ON THE PUR RADIO RESOURCES CONFIGURED IN THE PUR CONFIGURATION TO THE RAN WITHOUT PERFORMING A RANDOM ACCESS PROCEDURE WITH THE RAN — 1310

No

1312 — PERFORM A RANDOM ACCESS PROCEDURE TO TRANSMIT THE DATA

1314 — TRANSMIT DATA ON A MESSAGE 3 OR MESSAGE A OF THE RANDOM ACCESS PROCEDURE

Figure 13

EARLY DATA COMMUNICATION WITH PRECONFIGURED RESOURCES

CROSS-REFERENCE TO RELATED APPLICATIONS

This application claims priority to and the benefit of the filing date of U.S. Provisional Patent Application No. 63/137,280 entitled "Early Data Communication with Pre-configured Resources," filed on Jan. 14, 2021, the entire disclosure of which is hereby expressly incorporated by reference.

FIELD OF THE DISCLOSURE

This disclosure relates generally to wireless communications and, more particularly, to communication of uplink and/or downlink data on preconfigured resources at a user equipment (UE) and a distributed unit (DU) when the UE operates in an inactive or idle state associated with a protocol for controlling radio resources.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally speaking, a base station operating a cellular radio access network (RAN) communicates with a user equipment (UE) using a certain radio access technology (RAT) and multiple layers of a protocol stack. For example, the physical layer (PHY) of a RAT provides transport channels to the Medium Access Control (MAC) sublayer, which in turn provides logical channels to the Radio Link Control (RLC) sublayer, and the RLC sublayer in turn provides data transfer services to the Packet Data Convergence Protocol (PDCP) sublayer. The Radio Resource Control (RRC) sublayer is disposed above the PDCP sublayer.

The RRC sublayer specifies the RRC_IDLE state, in which a UE does not have an active radio connection with a base station; the RRC_CONNECTED state, in which the UE has an active radio connection with the base station; and the RRC_INACTIVE to allow a UE to more quickly transition back to the RRC_CONNECTED state due to Radio Access Network (RAN)-level base station coordination and RAN-paging procedures. In some cases, the UE in the RRC_IDLE or RRC_INACTIVE state has only one, relatively small packet to transmit. In these cases, the UE in the RRC_IDLE or RRC_INACTIVE state can perform an early data transmission without transitioning to the RRC_CON-NECTED state, e.g., by using techniques as specified in section 7.3a-7.3d in 3GPP specification 36.300 v16.4.0. In section 7.3d of the 3GPP specification, a base station (i.e., eNB or ng-eNB) can transmit to the UE an RRCConnec-tionRelease message including a preconfigured uplink resource (PUR) configuration, while the UE is in the RRC_CONNECTED state. Thus, the UE in one implementation can transmit to the base station an RRCEarlyDataRequest message containing a user data packet, as described in section 7.3d in the 3GPP specification. In another implementation, the UE can transmit to the base station a user data packet on DTCH multiplexed with an RRCConnectionRe-sumeRequest message on CCCH. That is, the UE generates a MAC PDU including an RRCConnectionResumeRequest message and the user data packet, as described in section 7.3d in the 3GPP specification.

However, in some scenarios and implementations, the UE may connect to a 5G NR radio access network (i.e., the NG-RAN) including base stations where each includes of a central unit (CU) and at least one distributed unit (DU). It is not clear how a base station including a CU and a DU configures a PUR configuration for the UE. As described in section 8.6.1 in 3GPP specification 38.401 v16.4.0, the CU sends a UE Context Release Command including a RRCRe-lease message to the UE. If the DU configures a PUR configuration for the UE before receiving the UE Context Release Command message, the DU releases all of the configurations that the DU configures for the UE in accordance with 3GPP specification 38.473, e.g., v16.4.0. If the CU configures a PUR configuration for the UE, the DU will not be aware of the PUR configuration. When the UE transmits a user data packet as described in section 7.3d on a PUSCH configured by the PUR configuration, the DU would not attempt to receive the PUSCH, because the DU is not aware of the PUR configuration.

SUMMARY

According to the techniques of this disclosure, a UE is in an RRC_CONNECTED state with a base station having a CU and a DU. The UE may transmit a PUR configuration request message to the DU to indicate to the CU that the UE is interested in being configured with a PUR configuration. Accordingly, the DU and the CU may communicate to generate the PUR configuration. Then when the CU determines that the UE should transition to the inactive state, the CU generates an RRC release message including the PUR configuration. The CU may generate a UE Context Release Command and include the RRC release message in the UE Context Release Command. Then the CU may transmit the UE Context Release Command to the DU, which transmits the RRC release message to the UE. Additionally, the DU may retain the PUR configuration and release the DU configuration. In other implementations, the CU may generate a UE Context Modification Request message or a DL RRC Message Transfer message and include the RRC release message in the UE Context Modification Request message or the DL RRC Message Transfer message. In these other implementations, the DU may retain the PUR configuration and the DU configuration.

In response to receiving the RRC release message, the UE transitions to the inactive state. The UE in the inactive state may communicate (e.g., transmit and/or receive) data with (e.g., to and/or from) the DU on PUR radio resources configured in the PUR configuration without performing a random access procedure with the DU.

In some implementations, the UE in an RRC_CON-NECTED state communicates with a first DU and a second DU in the base station. When the CU determines that the UE should transition to the inactive state, the CU generates an RRC release message including a first PUR configuration for the first DU and a second configuration for the second DU. Then the CU may transmit the RRC release message to the DU, which transmits the RRC release message to the UE. In response to receiving the RRC release message, the UE transitions to the inactive state. The UE in the inactive state may communicate (e.g., transmit and/or receive) data with (e.g., to and/or from) the first DU on first PUR radio resources configured in the first PUR configuration without performing a random access procedure with the first DU, and may communicate data with the second DU on second PUR radio resources configured in the second PUR configuration without performing a random access procedure with the second DU.

In other implementations, the UE in an RRC_CONNECTED state communicates with a DU in a first base station and with a second base station. When the CU determines that the UE should transition to the inactive state, the CU generates an RRC release message including a first PUR configuration for the DU and a second configuration for the second base station. Then the CU may transmit the RRC release message to the DU, which transmits the RRC release message to the UE. In response to receiving the RRC release message, the UE transitions to the inactive state. The UE in the inactive state may communicate (e.g., transmit and/or receive) data with (e.g., to and/or from) the DU on first PUR radio resources configured in the first PUR configuration without performing a random access procedure with the first DU, and may communicate data with the second base station on second PUR radio resources configured in the second PUR configuration without performing a random access procedure with the second base station.

An example embodiment of these techniques is a method in a distributed unit (DU) of a base station for processing early data transmissions from a UE. The method includes transmitting, by processing hardware, a preconfigured uplink resource (PUR) configuration to the UE in a release message that instructs the UE to transition to an inactive state. While the UE is in the inactive state, the method includes receiving, by the processing hardware from the UE, a data packet via a PUR resource configured in the PUR configuration.

Another example embodiment of these techniques is a DU of a base station including processing hardware and configured to implement the method above.

Still another example embodiment of these techniques is a method in a central unit (CU) of a base station for processing early data transmissions from a UE. The method includes determining, by processing hardware, to transition the UE in a connected state with the base station to an inactive state, generating, by the processing hardware, a release message including a preconfigured uplink resource (PUR) configuration, and transmitting, by the processing hardware, the release message to the UE via a distributed unit (DU) of the base station.

Yet another example embodiment of these techniques is a CU of a base station including processing hardware and configured to implement the method above.

Another example embodiment of these techniques is a method in a UE for early data transmissions to a base station. The method includes receiving, by processing hardware from a distributed unit (DU) of the base station, a preconfigured uplink resource (PUR) configuration in a release message that instructs the UE to transition to an inactive state. While the UE is in the inactive state, the method includes transmitting, by the processing hardware to the DU, a data packet via a PUR resource configured in the PUR configuration.

Still another example embodiment of these techniques is a UE including processing hardware and configured to implement the method above.

BRIEF DESCRIPTION OF THE DRAWINGS

FIG. 3B is a messaging diagram of another example procedure for obtaining a PUR configuration for transmitting a data packet from a UE to a DU in a base station when a radio connection between the UE and the base station is inactive;

FIG. 6 is a flow diagram of an example method for processing early data transmissions from a UE, which can be implemented in the DU of FIG. 1B;

FIG. 7 is a flow diagram of an example method for processing early data transmissions from a UE, which can be implemented in the CU of FIG. 1B;

FIG. 8 is a flow diagram of an example method for determining how to transmit a release message when processing early data transmissions from a UE, which can be implemented in the CU of FIG. 1B;

FIG. 9 is a flow diagram of another example method for processing early data transmissions from a UE, which can be implemented in the CU of FIG. 1B;

FIG. 10A is a flow diagram of an example method for determining whether a current serving cell for a UE is in a list of cells having preconfigured resources when performing early data transmission procedures with a base station, which can be implemented in the UE of FIG. 1A;

FIG. 11A is a flow diagram of an example method for determining whether a physical or logical resource for a UE is in a list of physical or logical resources having preconfigured resources when performing early data transmission procedures with a base station, which can be implemented in the UE of FIG. 1A;

FIG. 11B is a flow diagram of another example method for determining whether a physical or logical resource for a UE is in a list of physical or logical resources having preconfigured resources when performing early data transmission procedures with a base station, which can be implemented in the UE of FIG. 1A;

FIG. 12B is a flow diagram of another example method for determining whether a preconfigured resource is available at a time when the UE is transmitting data when performing early data transmission procedures with a base station, which can be implemented in the UE of FIG. 1A; and FIG. 13 is a flow diagram of an example method for determining whether a second time when a preconfigured resource is available is within a threshold time period of a current time for the UE to transmit data when performing early data transmission procedures with a base station, which can be implemented in the UE of FIG. 1A.

DETAILED DESCRIPTION OF THE DRAWINGS

Figure 1A:
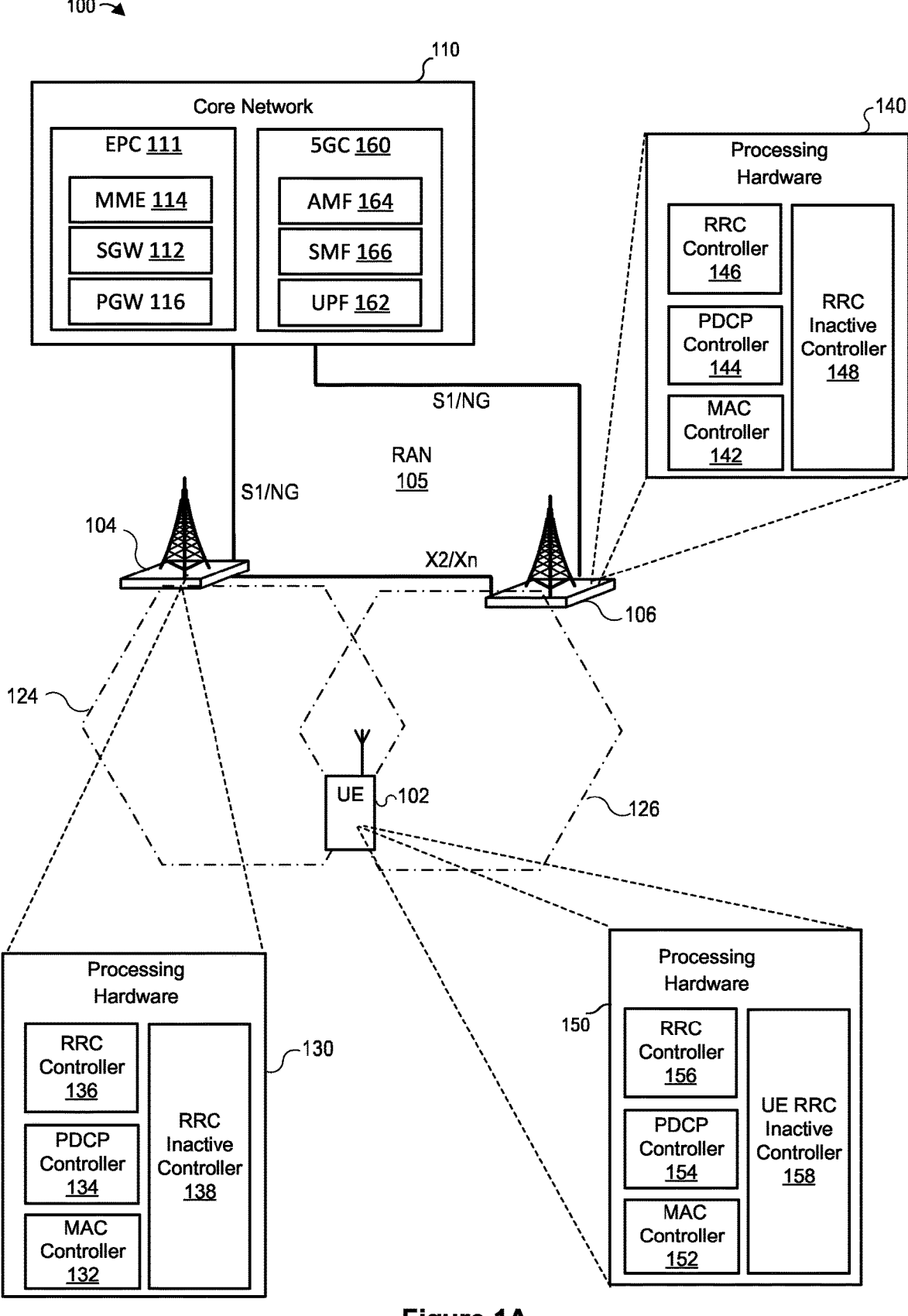
FIG. 1A is a block diagram of an example wireless communication system in which a user device and a base station of this disclosure can implement the techniques of this disclosure for reducing latency in data communication.

Referring first to FIG. 1A, an example wireless communication system 100 includes a UE 102, a base station (BS) 104, a base station 106, and a core network (CN) 110. The base stations 104 and 106 can operate in a RAN 105 connected to the core network (CN) 110. The CN 110 can be implemented as an evolved packet core (EPC) 111 or a fifth generation (5G) core (5GC) 160, for example. The CN 110 can also be implemented as a sixth generation (6G) core in another example.

The base station 104 covers a cell 124, and the base station 106 covers a cell 126. If the base station 104 is a gNB, the cell 124 is an NR cell. If the base station 124 is an ng-eNB, the cell 124 is an evolved universal terrestrial radio access (E-UTRA) cell. Similarly, if the base station 106 is a gNB, the cell 126 is an NR cell, and if the base station 126 is an ng-eNB, the cell 126 is an E-UTRA cell. The cells 124 and 126 can be in the same Radio Access Network Notification Areas (RNA) or different RNAs. In general, the RAN 105 can include any number of base stations, and each of the base stations can cover one, two, three, or any other suitable number of cells. The UE 102 can support at least a 5G NR (or simply, "NR") or E-UTRA air interface to communicate with the base stations 104 and 106. Each of the base stations 104, 160 can connect to the CN 110 via an interface (e.g., S1 or NG interface). The base stations 104 and 106 also can be interconnected via an interface (e.g., X2 or Xn interface) for interconnecting NG RAN nodes.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1, the base station 104 supports a cell 124, and the base station 106 supports a cell 126. The cells 124 and 126 can partially overlap, so that the UE 102 can select, reselect or hands over from one of the cells 124 and 126 to the other. To directly exchange messages or information, the base station 104 and base station 106 can support an X2 or Xn interface. In general, the CN 110 can connect to any suitable number of base stations supporting NR cells and/or EUTRA cells.

As discussed in detail below, the UE 102 and/or the RAN 105 of this disclosure reduces latency in uplink transmission of data when the radio connection between the UE 102 and the RAN 105 is suspended, e.g., in the inactive or idle state of the protocol for controlling radio resources between the UE 102 and the RAN 105. For clarity, the examples below refer to the RRC_INACTIVE or RRC_IDLE state of the RRC protocol.

As used in this disclosure, the term "data" or "data packet" refers to signaling, control-plane information at a protocol layer of controlling radio resources (e.g., RRC), controlling mobility management (MM), controlling session management (SM), or refers to non-signaling, non-control-plane information at protocol layers above the layer of the protocol for controlling radio resources (e.g., RRC), above the layer of the protocol for controlling mobility management (MM), above the layer of the protocol for controlling session management (SM), or above the layer of the protocol for controlling quality of service (QoS) flows (e.g., service data adaptation protocol (SDAP)). The data to which the UE and/or the RAN applies the techniques of this disclosure can include for example Internet of things (IoT) data, Ethernet traffic data, Internet traffic data, or a short message service (SMS) message. Further, as discussed below, the UE 102 in some implementations applies these techniques only if the size of the data is below a certain threshold value.

In the example scenarios discussed below, the UE 102 transitions to the RRC_INACTIVE or RRC_IDLE state, then selects a cell of the base station 104, and exchanges data with the base station 104 either via the base station 106 or with the base station 104 directly, without transitioning to the RRC_CONNECTED state. As a more specific example, after the UE 102 determines that data is available for uplink transmission in the RRC_INACTIVE or RRC_IDLE state, the UE 102 can apply one or more security functions to the UL data packet, generate a first UL protocol data unit (PDU) including the security-protected packet, include an uplink (UL) RRC message along with the first UL PDU in a second UL PDU, and transmit the second UL PDU to the RAN 105. The UE 102 includes a UE identity/identifier (ID) of the UE 102 in the UL RRC message. The RAN 105 can identify the UE 102 based on the UE ID. In some implementations, the UE ID can be an inactive Radio Network Temporary Identifier (I-RNTI) or a non-access stratum (NAS) ID. The NAS ID can be a S-Temporary Mobile Subscriber Identity (S-TMSI) or a Global Unique Temporary Identifier (GUTI).

The security function can include an integrity protection and/or encryption function. When integrity protection is enabled, the UE 102 can generate a message authentication code for integrity (MAC-I) to protect integrity of the data. Thus, the UE 102 in this case generates a security-protected packet including the data and the MAC-I. When encryption is enabled, the UE 102 can encrypt the data to obtain an encrypted packet, so that the security-protected packet includes encrypted data. When both integrity protection and encryption are enabled, the UE 102 can generate a MAC-I for protecting integrity of the data and encrypt the data along with the MAC-I to generate an encrypted packet and an encrypted MAC-I. The UE 102 then can transmit the security-protected packet to the RAN 105, while in the RRC_INACTIVE or RRC_IDLE state.

In some implementations, the data is an uplink (UL) service data unit (SDU) of the packet data convergence protocol (PDCP) or SDAP. The UE 102 applies the security function to the SDU and includes the secured SDU in a first UL PDU (e.g., a UL PDCP PDU). The UE 102 then includes the UL PDCP PDU in a second UL PDU such as a UL MAC PDU, which can be associated with the medium access control (MAC) layer. Thus, the UE 102 in these cases transmits the secured UL PDCP PDU in the UL MAC PDU. In some implementations, the UE 102 can include, in the UL MAC PDU, a UL RRC message. In other implementations, the UE 102 may not include a UL RRC message in the UL MAC PDU. In this case, the UE 102 may not include a UE ID of the UE 102 in the UL MAC PDU that does not include a UL RRC message. In yet other implementations, the UE 102 can include the UL PDCP PDU in a UL radio link control (RLC) PDU and then include the UL RLC PDU in the UL MAC PDU. In the case of including the UL RRC message in the UL MAC PDU, the UE 102 in some implementations generates an RRC MAC-I and includes the RRC MAC-I in the UL RRC message. For example, the RRC MAC-I is a resumeMAC-I field, as specified in 3GPP specification 38.331. In other implementations, the UE can obtain the RRC MAC-I from the UL RRC message with an integrity key (e.g., $K_{RRCint}$ key), an integrity protection algorithm, and other parameters such as COUNT (e.g., 32-bit, 64-bit or 128-bit value), BEARER (e.g., 5-bit value), and DIRECTION (e.g., 1-bit value).

In other implementations, the data is an uplink (UL) protocol data unit (SDU) of the NAS. The UE 102 applies the security function to the SDU and includes the secured SDU in a first UL PDU such as a NAS PDU, which can be associated with the NAS layer. For example, the NAS layer can be 5G MM or SM sublayer of 5G, evolved packet system (EPS) or 6G. Then the UE 102 can include the UL NAS PDU in a second UL PDU such as a UL RRC message. Thus, the UE 102 in these cases transmits the (first) secured UL NAS PDU in the UL RRC message. In some implementations, the UE 102 can include the UL RRC message in a UL MAC PDU and transmits the UL MAC PDU to a base station (e.g., base station 104 or 106) via a cell (e.g., cell 124 or 126). In this case, the UE 102 may not include an RRC MAC-I in the UL RRC message. Alternatively, the UE 102 may include an RRC MAC-I as described above.

In some implementations, the UL RRC message described above can be a common control channel (CCCH) message, an RRC resume request message, or an RRC early data request message. The UL RRC message can include a UE ID of the UE 102 as described above.

More generally, the UE 102 can secure the data using at least one of encryption and integrity protection, include the secured data as a security-protected packet in the first UL PDU, and transmit the first UL PDU to the RAN 105 in the second UL PDU.

In some scenarios and implementations, the base station 106 can retrieve the UE ID of the UE 102 from the UL RRC message and identify the base station 104 as the destination of the data in the first UL PDU, based to the determined UE ID. In one example implementation, the base station 106 retrieves the first UL PDU from the second UL PDU and transmits the first UL PDU to the base station 104. The base station 104 then retrieves the security-protected packet from the first UL PDU, applies one or two security functions to decrypt the data and/or check the integrity protection, and transmits the data to the CN 110 (e.g., SGW 112, UPF 162, MME 114 or AMF 164) or an edge server. More specifically, the base station 104 derives at least one security key from UE context information of the UE 102. Then the base station 104 retrieves the data from the security-protected packet by using the at least one security key and transmits the data to the CN 110 or edge server. When the security-protected packet is an encrypted packet, the base station 104 decrypts the encrypted packet to obtain the data by using the at least one security key (e.g., an (de-) encryption key). If the security-protected packet is an integrity-protected packet, the integrity protected packet may include the data and the MAC-I. The base station 104 can verify whether the MAC-I is valid for the security-protected packet by using the at least one security key (e.g., an integrity key). When the base station 104 confirms that the MAC-I is valid, the base station 104 sends the data to the CN 110 or edge server. On the other hand, when the base station 104 determines the MAC-I is invalid, the base station 104 discards the security-protected packet. Further, if the security-protected packet is both encrypted and integrity-protected, the encrypted and integrity-protected packet may include the encrypted packet along with the encrypted MAC-I. The base station 104 in this case decrypts the encrypted packet and the encrypted MAC-I to obtain the data and the MAC-I. The base station 104 then determines whether the MAC-I is valid for the data. If the base station 104 determines that the MAC-I is valid, the base station 104 retrieves the data and forwards the data to the CN 110 or edge server. However, if the base station 104 determines that the MAC-I is invalid, the base station 104 discards the packet.

In another implementation, the base station 106 retrieves the security-protected packet from the first UL PDU. The base station 106 performs a retrieve UE context procedure with the base station 104 to obtain UE context information of the UE 102 from the base station 104. The base station 106 derives at least one security key from the UE context information. Then the base station 106 retrieves the data from the security-protected packet by using the at least one security key and transmits the data to the CN 110 (e.g., UPF 162) or an edge server. When the security-protected packet is an encrypted packet, the base station 106 decrypts the encrypted packet to obtain the data by using the at least one security key (e.g., an (de-) encryption key). If the security-protected packet is an integrity-protected packet, the integrity protected packet may include the data and the MAC-I. The base station 106 can verify whether the MAC-I is valid for the security-protected packet by using the at least one security key (e.g., an integrity key). When the base station 106 confirms that the MAC-I is valid, the base station 106 sends the data to the CN 110. On the other hand, when the base station 106 determines the MAC-I is invalid, the base station 106 discards the security-protected packet. Further, if the security-protected packet is both encrypted and integrity-protected, the encrypted and integrity-protected packet may include the encrypted packet along with the encrypted MAC-I. The base station 106 in this case decrypts the encrypted packet and the encrypted MAC-I to obtain the data and the MAC-I. The base station 106 then determines whether the MAC-I is valid for the data. If the base station 106 determines that the MAC-I is valid, the base station 106 retrieves the data and forwards the data to the data CN 112. However, if the base station 106 determines that the MAC-I is invalid, the base station 106 discards the packet.

In other scenarios and implementations, the base station 104 can retrieve the UE ID of the UE 102 from the UL RRC message and identify that the base station 104 stores UE context information of the UE 102. Thus, the base station 104 retrieves the security-protected packet from the first UL PDU, retrieve the data from the security-protected packet and sends the data to the CN 110 or edge server as described above.

Further, the RAN 105 in some cases transmits data in the downlink (DL) direction to the UE 102 operating in the RRC_INACTIVE or RRC_IDLE state.

For example, when the base station 104 determines that data is available for downlink transmission to the UE 102 currently operating in the RRC_INACTIVE or RRC_IDLE state, the base station 104 can apply at least one security function to the data to generate a security-protected packet, generate a first DL PDU including the security-protected packet, and the first DL PDU in a second DL PDU. To secure the data, the base station 104 can apply the security function (e.g., integrity protection and/or encryption) to the data. More particularly, when integrity protection is enabled, the base station 104 generates a MAC-I for protecting integrity of the data, so that security-protected packet includes the data and the MAC-I. When encryption is enabled, the base station 104 encrypts the data to generate an encrypted packet, so that security-protected packet is an encrypted packet. Further, when both integrity protection and encryption are enabled, the base station 104 can generate a MAC-I for protecting integrity of the data and encrypt the data along with the MAC-I to generate an encrypted packet and an encrypted MAC-I. The base station 104 in some implementations generates a first DL PDU, such as a DL PDCP PDU, using the security-protected packet, includes the first DL PDU in a second DL PDU associated with the MAC layer for example (e.g., a DL MAC PDU), and transmits the second DL PDU to the UE 102 without first causing the UE 102 to transition from the RRC_INACTIVE or RRC_IDLE state to the RRC_CONNECTED state. In some implementations, the base station 104 includes the DL PDCP PDU in a DL RLC PDU, includes the DL RLC PDU in the DL MAC PDU and transmits the DL MAC PDU to the UE 102 without first causing the UE 102 to transition from the RRC_INAC-TIVE or RRC_IDLE state to the RRC_CONNECTED state.

In another implementation, the base station 104 transmits the first DL PDU to the base station 106, which then generates a second PDU (e.g., a DL MAC PDU) including the first DL PDU and transmits the second DL PDU to the UE 102 without first causing the UE 102 to transition from the RRC_INACTIVE or RRC_IDLE state to the RRC_CO-NNECTED state. In some implementations, the base station 106 generates a DL RLC PDU including the first DL PDU and includes the DL RLC PDU in the second DL PDU. In yet another implementation, the base station 104 includes the first DL PDU in a DL RLC PDU and transmits the DL RLC PDU to the base station 106, which then generate a second DL PDU (e.g. a DL MAC PDU) including the DL RLC PDU and transmits the second DL PDU to the UE 102.

In some implementations, the base station (i.e., the base station 104 or 106) generates a downlink control information (DCI) and a cyclic redundancy check (CRC) scrambled with an ID of the UE 102 to transmit the second DL PDU generated by the base station. In some implementations, the ID of the UE 102 can be a Radio Network Temporary Identifier (RNTI). For example, the RNTI can be a cell RNTI (C-RNTI), a temporary C-RNTI or an inactive C-RNTI. The base station transmits the DCI and scrambled CRC on a physical downlink control channel (PDCCH) to the UE 102 operating in the RRC_INACTIVE or RRC_IDLE state. In some implementations, the base station may assign the ID of the UE 102 to the UE 102 in a random access response that the base station transmits in a random access procedure with the UE 102 before transmitting the DCI and scrambled CRC. In other implementations, the base station may assign the ID of the UE 102 to the UE 102 in an RRC message (e.g., RRC release message or an RRC reconfiguration message) that the base station transmits to the UE 102 before transmitting the DCI and scrambled CRC.

The UE 102 operating in the RRC_INACTIVE or RRC_IDLE state can receive the DCI and scrambled CRC on the PDCCH. Then the UE 102 confirms that the second DL PDU is addressed to the UE according to the ID of the UE 102. The UE 102 then can retrieve the data from the security-protected packet. If the security-protected packet is an encrypted packet, the UE 102 can decrypt the encrypted packet using the appropriate decryption function and the security key to obtain the data. If the security-protected packet is the integrity-protected packet including the data and the MAC-I, the UE 102 can determine whether the MAC-I is valid. If the UE 102 confirms that the MAC-I is valid, the UE 102 retrieves the data. If, however, the UE 102 determines that the MAC-I is invalid, the UE 102 discards the packet. Finally, when the security-protected packet is both encrypted and integrity-protected, with encrypted data and an encrypted MAC-I, the UE 102 can decrypt the encrypted packet and encrypted MAC-I to obtain the data and the MAC-I. The UE 102 then can verify that the MAC-I is valid for the data. If the UE 102 confirms that the MAC-I is valid, the UE 102 retrieves and processes the data. Otherwise, when the UE 102 determines that the MAC-I is invalid, the UE 102 discards the data.

The base station 104 is equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 130 in an example implementation includes a Medium Access Control (MAC) controller 132 configured to perform a random access procedure with one or more user devices, receive uplink MAC protocol data units (PDUs) to one or more user devices, and transmit downlink MAC PDUs to one or more user devices. The processing hardware 130 can also include a Packet Data Convergence Protocol (PDCP) controller 134 configured to transmit PDCP PDUs in accordance with which the base station 104 can transmit data in the downlink direction, in some scenarios, and receive PDCP PDUs in accordance with which the base station 104 can receive data in the uplink direction, in other scenarios. The processing hardware further can include an RRC controller 136 to implement procedures and messaging at the RRC sublayer of the protocol communication stack. The processing hardware 130 in an example implementation includes an RRC inactive controller 138 configured to manage uplink and/or downlink communications with one or more UEs operating in the RRC_INACTIVE or RRC_IDLE state. The base station 106 can include generally similar components. In particular, components 142, 144, 146, and 148 can be similar to the components 132, 134, 136, and 138, respectively.

The UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes an RRC inactive controller 158 configured to manage uplink and/or downlink communications when the UE 102 operates in the RRC_I-NACTIVE state. The processing hardware 150 in an example implementation includes a Medium Access Control (MAC) controller 132 configured to perform a random access procedure with a base station, transmit uplink MAC protocol data units (PDUs) to the base station, and receive downlink MAC PDUs from the base station. The processing hardware 150 can also include a PDCP controller 154 configured to transmit PDCP PDUs in accordance with which the UE 102 can transmit data in the uplink direction, in some scenarios, and receive PDCP PDUs in accordance with which the UE 102 can receive data in the downlink direction, in other scenarios. The processing hardware further can include an RRC controller 156 to implement procedures and messaging at the RRC sublayer of the protocol communication stack.

Figure 1B:
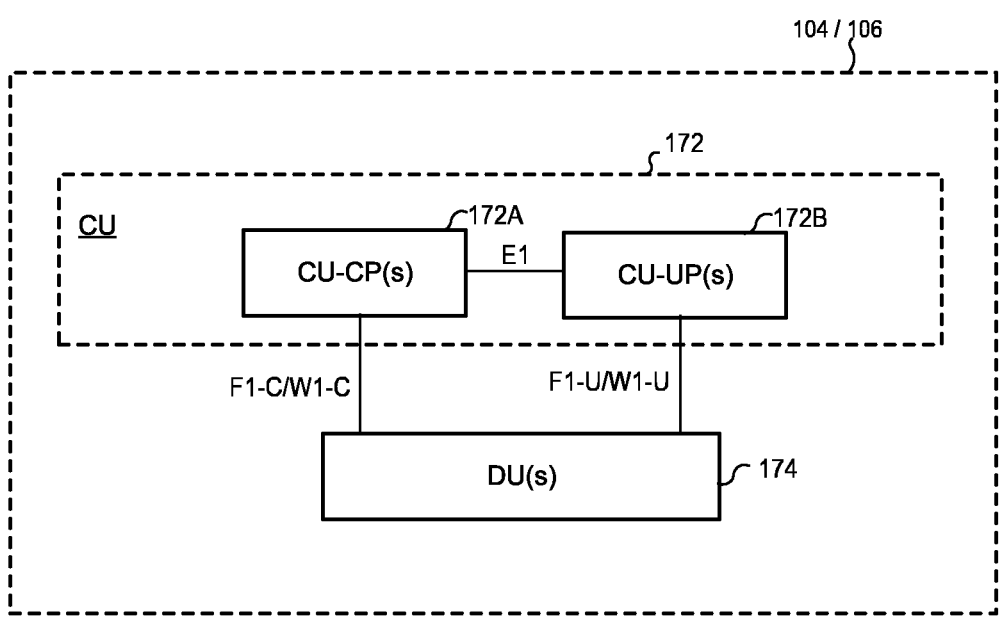
FIG. 1B is a block diagram of an example base station in which a centralized unit (CU) and a distributed unit (DU) that can operate in the system of FIG. 1A.

FIG. 1B depicts an example, distributed or disaggregated implementation of any one or more of the base stations 104, 106. In this implementation, the base station 104A, 104B, 106A, or 106B includes a central unit (CU) 172 and one or more DUs 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include a PDCP controller, an RRC controller and/or an RRC inactive controller such as PDCP controller 134, 144, RRC controller 136, 146 and/or RRC inactive controller 138, 148. In some implementations, the CU 172 can include a radio link control (RLC) controller configured to manage or control one or more RLC operations or procedures. In other implementations, the CU 172 does not include a RLC controller.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a MAC controller (e.g., MAC controller 132, 142) configured to manage or control one or more MAC operations or procedures (e.g., a random access procedure), and/or a RLC controller configured to manage or control one or more RLC operations or procedures. The processing hardware can also include a physical layer controller configured to manage or control one or more physical layer operations or procedures.

In some implementations, the CU 172 can include a logical node CU-CP 172A that hosts the control plane part of the PDCP protocol of the CU 172. The CU 172 can also include logical node(s) CU-UP 172B that hosts the user plane part of the PDCP protocol and/or Service Data Adaptation Protocol (SDAP) protocol of the CU 172. The CU-CP 172A can transmit control information (e.g., RRC messages, F1 application protocol messages), and the CU-UP 172B can transmit the data packets (e.g., SDAP PDUs or Internet Protocol packets).

The CU-CP 172A can be connected to multiple CU-UP 172B through the E1 interface. The CU-CP 172A selects the appropriate CU-UP 172B for the requested services for the UE 102. In some implementations, a single CU-UP 172B can be connected to multiple CU-CP 172A through the E1 interface. If the CU-CP and DU(s) belong to a gNB, the CU-CP 172A can be connected to one or more DU 174s through an F1-C interface and/or an F1-U interface. If the CU-CP and DU(s) belong to a ng-eNB, the CU-CP 172A can be connected to one or more DU 174s through a W1-C interface and/or a W1-U interface. In some implementations, one DU 174 can be connected to multiple CU-UPs 172B under the control of the same CU-CP 172A. In such implementations, the connectivity between a CU-UP 172B and a DU 174 is established by the CU-CP 172A using Bearer Context Management functions.

Figure 2:
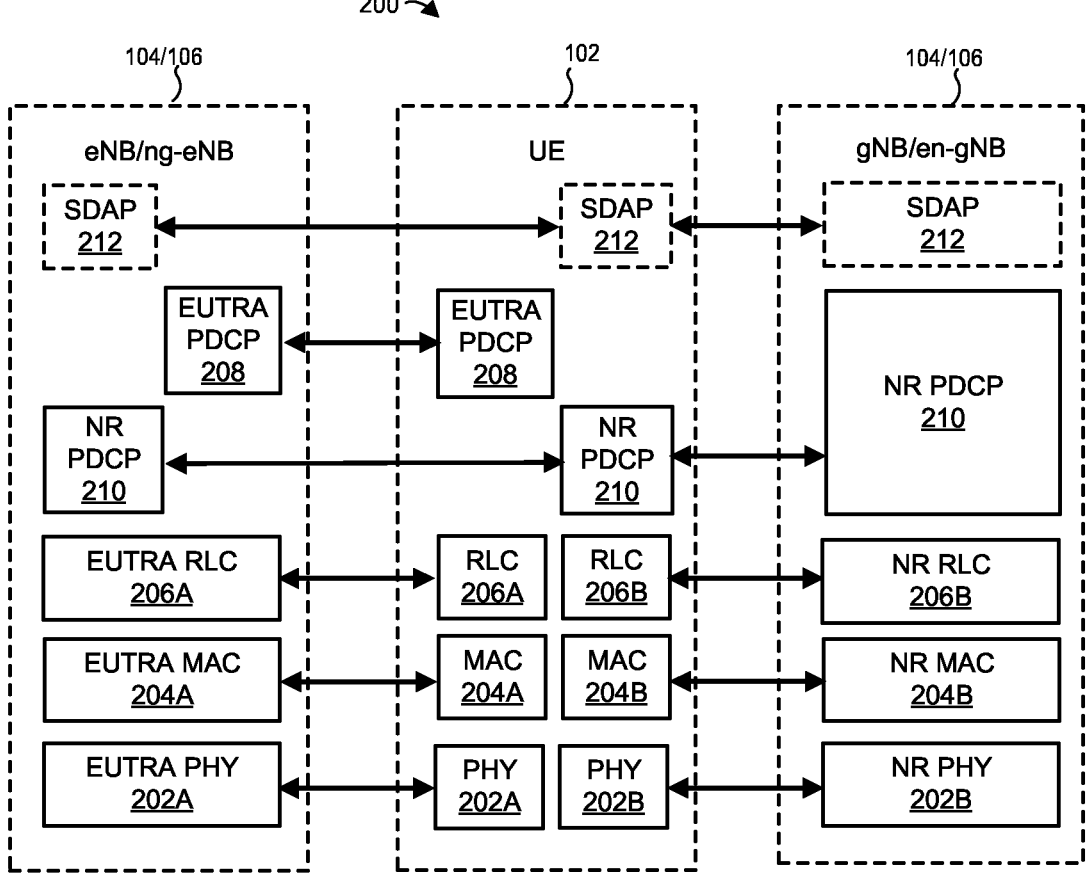
FIG. 2 is a block diagram of an example protocol stack according to which the UE of FIG. 1A communicates with base stations.

FIG. 2A illustrates, in a simplified manner, an example protocol stack 200 according to which the UE 102 can communicate with an eNB/ng-eNB or a gNB (e.g., one or more of the base stations 104, 106).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to a EUTRA PDCP sublayer 208 and, in some cases, to an NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to Service Data Adaptation Protocol (SDAP) 212 or a radio resource control (RRC) sublayer (not shown in FIG. 2A). The UE 102, in some implementations, supports both the EUTRA and the NR stack as shown in FIG. 2A, to support handover between EUTRA and NR base stations and/or to support DC over EUTRA and NR interfaces. Further, as illustrated in FIG. 2A, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide signaling radio bearers (SRBs) or RRC sublayer (not shown in FIG. 2) to exchange RRC messages or non-access-stratum (NAS) messages, for example. On a user plane, the EUTRA PDCP sublayer 208 and the NR PDCP sublayer 210 can provide data radio bearers (DRBs) to support data exchange. Data exchanged on the NR PDCP sublayer 210 can be SDAP PDUs, Internet Protocol (IP) packets or Ethernet packets.

Thus, it is possible to functionally split the radio protocol stack, as shown by the radio protocol stack 250 in FIG. 2B.

The CU at any of the IAB-donors 108A, 108B, or 108C can hold all the control and upper layer functionalities (e.g., RRC 214, SDAP 212, NR PDCP 210), while the lower layer operations (e.g., NR RLC 206B, NR MAC 204B, and NR PHY 202B) are delegated to the DU located at the IAB-node 104. To support connection to a 5GC, NR PDCP 210 provides SRBs to RRC 214, and NR PDCP 210 provides DRBs to SDAP 212 and SRBs to RRC 214.

Next, several example scenarios that involve several components of FIG. 1A and relate to transmitting data in an inactive or idle state with preconfigured uplink grant(s) are discussed next with reference to FIGS. 3A-5. To simplify the following description, the "inactive state" is used and can represent the RRC_INACTIVE or RRC_IDLE state.

Figure 3A:
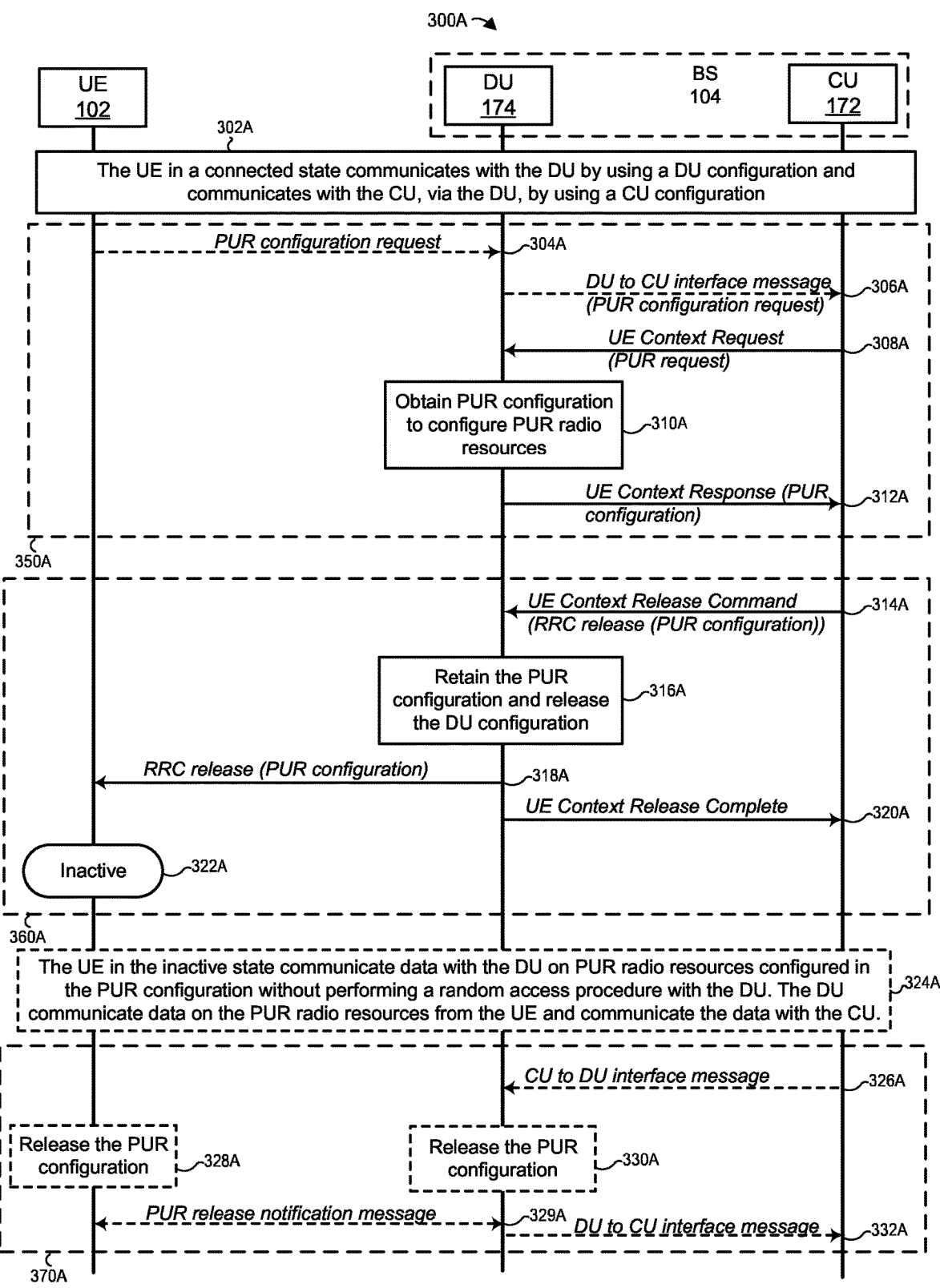
FIG. 3A is a messaging diagram of an example procedure for obtaining a PUR configuration for transmitting a data packet from a UE to a DU in a base station when a radio connection between the UE and the base station is inactive.

Referring first to FIG. 3A, which illustrates a scenario 300A, in which the base station 104 includes a central unit (CU) 172 and a distributed unit (DU) 174. In this scenario, the UE 102 initially in a connected state 302A communicates with the DU 174 by using a DU 174 configuration and communicates with the CU 172 via the DU by using a CU configuration. While the UE operates 302A in the connected state, the CU 172 can send 308A a UE Context Request message (e.g., UE Context Modification Request message) to instruct the DU 174 to provide a PUR configuration for the UE 102. In some implementations, the CU 172 can include a PUR request indication (e.g., a field or information element (IE)) to request a PUR configuration in the UE Context Request message. In response to the PUR request indication or the UE Context Request message, the DU 174 generates or obtains 310A a PUR configuration configuring PUR radio resources for the UE 102, generates a UE Context Response message (e.g., UE Context Modification Response message or UE Context Modification Required message) including the PUR configuration, and sends 312A the UE Context Response message to the CU 172. Alternatively, the DU 174 does not include the PUR configuration in the UE Context Response message. Instead, the DU 174 sends to the CU 172 a DU to CU interface message (e.g., UE Context Modification Required message) including the PUR configuration. In some implementations, the DU 174 generates the PUR configuration at event 310A upon or before receiving 308A the UE Context Request message. In other implementations, the DU 174 can store a list of one or more preconfigured PUR configuration(s) and the DU 174 can obtain the PUR configuration from the list at event 310A.

In some implementations, the UE 102 transmits 304A a PUR configuration request message to the DU 174 to indicate to the CU 172 that the UE is interested in being configured with a PUR configuration and/or provides PUR related information indicating preferences of the UE 102 for the PUR configuration. In turn, the DU 174 sends 306A a DU to CU interface message including the PUR configuration request message to the CU 172. The DU 174 in this case tunnels the PUR configuration request message to the CU 172 without processing this message because the DU 174 may not comprehend the PUR configuration request message in its current format. For example, the UE 102 applies one or more security functions (e.g., encryption and/or integrity protection) to the PUR configuration request message with one or more security keys. The DU 174 neither has the security key(s) (same as the security key(s) used by the UE 102) to apply (inverse) security function(s) to the security-protected PUR configuration request message nor implements the (inverse) security function(s). Thus, the DU 174 cannot comprehend the security-protected PUR configuration request message. Instead, the CU 172 has the security key(s) (same as the security key(s) used by the UE

102) to apply the (inverse) security function(s) and implements the (inverse) security function(s). Thus, the CU 172 applies the (inverse) security function(s) with the security key(w) to the security-protected PUR configuration request message to obtain the original PUR configuration request message.

In some implementations, the UE 102 can include at least one of the following fields/IEs in the PUR related information:

--- requestedNumOccasions
Indicates the requested number of PUR grant occasions. Value one corresponds to one occasion and value infinite corresponds to infinite occasions.
requestedPeriodicityAndOffset
Indicates the requested periodicity for the PUR occasions and time offset until the first PUR occasion.
requestedTBS
Indicates the requested Transport Block Size (TBS) for the PUR. b328 corresponds to 328 bits, b344 corresponds to 344 bits and so on. The maximum requested TBS is limited to the UL TBS size supported by the UE.
rrc-ACK
Indicates RRC response message is preferred by the UE for acknowledging the reception of a transmission using PUR.

---

If the CU 172 can receive the PUR configuration request message from the UE 102 before transmitting the UE Context Request message at event 308A, the CU 172 in some implementations can include the PUR configuration request message or (at least a portion of) the PUR related information (e.g., at least one of the fields/IEs above) in the UE Context Request message. In such case, the CU 172 may or may not include the PUR request indication in the UE Context Request message. In some implementations, the DU 174 can generate the PUR configuration based on the PUR related information. For example, the DU 174 can configure occasions of PUR radio resources (i.e., PUR occasions) in accordance with periodicity and offset requested in the PUR configuration request message. In another example, the DU 174 can configure the maximum transport block size (TBS) in accordance with a TBS requested in the PUR configuration request message. In other implementations, the DU 174 may generate the PUR configuration in accordance with its radio resource management algorithm without considering the PUR related information. In other implementations, the CU 172 may ignore the PUR configuration request message or the PUR related information. In such cases, the CU 172 does not include the PUR related information in the UE Context Request message.

In some implementations, the CU 172 may include information, such as number of occasions, periodicity, offset and/or transport block size, in the PUR request indication or the UE Context Request message 308A. In some implementations, the CU 172 can obtain the information from the PUR configuration request message. In other implementations, the CU 172 can determine the information by itself, e.g., according to subscription information of the UE 102 or QoS parameters for the UE 102 received from the CN 110 (not shown in FIG. 3A). The QoS parameters may be associated to one or more radio bearers, one or more QoS flows or a PDU Session of the UE 102. In yet other implementations, the CU 172 can obtain a portion of the information from the PUR configuration request message and determine the rest of the information by itself.

The events 304A (optional), 306A (optional), 308A, 310A, 312A are collectively referred to in FIG. 3A as a PUR resources setup procedure 350A.

After a certain period of data inactivity, the CU 172 can determine that neither the CU 172 nor the UE 102 has transmitted any data in the downlink direction or the uplink direction, respectively, during the certain period. In response to the determination, the CU 172 sends 314A to the DU 174 a UE Context Release Command message which includes an RRC release message (e.g., RRCRelease message or RRC-ConnectionRelease message) including the PUR configuration. In turn, the DU 174 transmits 318A the RRC release message to the UE 102. The RRC release message instructs the UE 102 to transition to the inactive state. The UE 102 transitions 322A to the inactive state upon receiving the RRC release message. In response to the UE Context Release Command message, the DU 174 retains 316A the PUR configuration and releases the DU configuration, and sends 320A a UE Context Release Complete message to the CU 172. Thus, the DU 174 does not release the PUR configuration in response to the UE Context Release Command message.

In some implementations, the UE 102 releases the DU configuration or at least a portion of the DU configuration in response to the RRC release message. In other implementations, if the RRC release message instructs the UE 102 to transition to the inactive state (i.e., RRC_IDLE), the UE 102 releases the DU configuration. In yet other implementations, if the RRC release message instructs the UE to transition to the inactive state (i.e., RRC_INACTIVE), the UE 102 releases a first portion of the DU configuration and retains a second portion of the DU configuration.

In some implementations, the CU 172 does not include an indication in the UE Context Release Command message to instruct the DU 174 to retain the PUR configuration. The DU 174 retains the PUR configuration as described above. In other implementations, the CU 172 can include an indication in the UE Context Release Command message to instruct the DU 174 to retain the PUR configuration. Thus, the DU 174 retains the PUR configuration in response to the indication. If the DU 174 receives from the CU 172 a UE Context Release Command message excluding the indication, the DU 174 releases the PUR configuration. In yet other implementations, the CU 172 does not include an indication in the UE Context Release Command message to instruct the DU 174 to release the PUR configuration. Thus, the DU 174 retains the PUR configuration in response to the UE Context Release Command message excluding the indication. If the DU 174 receives from the CU 172 a UE Context Release Command message including the indication, the DU 174 releases the PUR configuration.

In some implementations, the DU 174 retains PUR radio resources configured by the PUR configuration while retaining the PUR configuration. In some implementations, the DU 174 releases radio resources configured by the DU configuration when releasing the DU configuration. In some implementations, the DU 174 releases all related signaling and user data transport resources for the UE 102 in response to the UE Context Release Command message. In different implementations, the DU 174 can transmit 318A the RRC release message to the UE 102, before, while, or after sending 320A the UE Context Release Complete message to the CU 172. The events 314A, 316A, 318A, 320A, 322A are collectively referred to in FIG. 3A as the PUR configuration procedure 360A.

In some implementations, the CU 172 can transmit 308A the UE Context Request message to the DU 174 in response to the determination that that neither the CU 172 nor the UE 102 has transmitted any data in the downlink direction or the uplink direction, respectively, during the certain period.

After receiving the PUR configuration from the DU 174, the CU 172 generates the RRC release message including the PUR configuration. In other implementations, before the determination, the CU 172 can transmit 308A the UE Context Request message and receives the PUR configuration from the DU 174.

After the PUR configuration procedure 360A, the UE 102 in the inactive state may communicate (e.g., transmit and/or receive) 324A data with (e.g., to and/or from) the DU 174 on PUR radio resources configured in the PUR configuration without performing a random access procedure with the DU 174. Thus, the DU 174 communicates (e.g., transmit and/or receive) 324A the data on the PUR radio resources with (e.g., to and/or from) the UE 102 and communicates (e.g., transmit and/or receive) the data with (e.g., to and/or from) the CU 172. The data in some example scenarios includes an RRC PDU, Internet Protocol (IP) packet(s), Ethernet packet(s) and/or application packet(s). The RRC PDU includes an RRC message. In other scenarios, the data includes RRC PDU(s) where each can include an RRC message, a NAS message, an IP packet, and Ethernet packet, or an application packet. Still further, the data in some scenarios can include RRC PDU(s) where each includes a NAS PDU, such that the NAS PDU includes an IP packet, and Ethernet packet, or an application packet. In some implementations, the RRC PDU or RRC message can be a UL-CCCH-Message or UL-CCCH-Message1 message. In some implementations, the RRC message can be an RRCEarlyDataRequest, RRCSetupRequest, RRCResumeRequest, RRCResumeRequest1, or an RRCSystemInfoRequest message. In other implementations, the RRC message can be an RRCRRCConnectionRequest, RRCResumeRequest, or RRCResumeRequest1 message.

In some implementations, the PUR configuration is valid according to one or more conditions (e.g., for a certain period of time or a certain number of HARQ new transmissions or a certain number of data packets that the UE can transmit). In these cases, the UE 102 releases 328A the PUR configuration after the certain period of time has passed or after the UE 102 has transmitted the certain number of HARQ new transmissions or certain number of data packets at event 324A. Correspondingly, the DU 174 releases 330A the PUR configuration after the certain period of time has passed or after the DU 174 has received the certain number of HARQ new transmissions or certain number of data packets from the UE 102 at event 324A. In other implementations, the UE 102 releases 328A the PUR configuration after the UE 102 has not transmitted data in a certain number of consecutive PUR occasions. Correspondingly, the DU 174 releases 330A the PUR configuration after the DU 174 has not received data in the certain number of consecutive PUR occasions. The DU 174 releases radio resources configured in the PUR configuration once the DU 174 releases the PUR configuration. In some implementations, the DU 174 sends 332A a DU to CU interface message to the CU 172 to notify that the PUR configuration is released in response to releasing 330A the PUR configuration.

In some implementations, the UE 102 can send 329A a PUR release notification message (e.g., a PUR release command) to the DU 174 to instruct the DU 174 to release the PUR configuration after the UE 102 releases 328A the PUR configuration. In response to 329A the PUR release notification message, the DU 174 releases 330A the PUR configuration and sends 332A a DU to CU release message to the CU 172 to notify the CU 172 that the PUR configuration is released.

In other implementations, the DU 174 can send 329A the PUR release notification message (e.g., a PUR release command) to the UE 102 to instruct the UE 102 to release the PUR configuration after the DU 174 releases 330A the PUR configuration. In response to 329A the PUR release notification message, the UE 102 releases 328A the PUR configuration.

In some implementations, the DU 174 can include field(s) or IE(s) to indicate the certain period of time and/or the certain number(s) in the PUR configuration. In other implementations, the CU 172 can include field(s) or IE(s) to indicate the certain period of time and/or the certain number(s) in the RRC release message 318A. In this case, the CU 172 can include the certain period of time and/or the certain number(s) in the UE Context Request message 308A or the UE Context Release Command message 314A. Alternatively, the CU 172 can include the certain period of time and/or the certain number(s) in a CU to DU interface message and send to the CU to DU interface message to the DU 174.

In some implementations, the CU 172 can send 326A a CU to DU interface message (e.g., PUR release command or UE Context Release Command message) to the DU 174 to instruct the DU 174 to release the PUR configuration after the CU 172 has received the certain number of the data packets from the UE 102 at event 324A. In response to 326A the CU to DU interface message, the DU 174 releases the PUR configuration and sends 332A a DU to CU release message (e.g., PUR release complete or UE Context Release Complete message) to the CU 172. If the CU to DU interface message is a UE Context Release Command message, the CU 172 in some implementations can include an indication in the UE Context Release Command message to indicate to the DU 174 to release the PUR configuration. Thus, the DU 174 releases the PUR configuration in response to the indication. In other implementations, if the CU to DU interface message is a UE Context Release Command message, the CU 172 in other implementations does not include an indication in the UE Context Release Command message to indicate to the DU 174 to retain the PUR configuration. Thus, the DU 174 releases the PUR configuration in response to the UE Context Release Command message excluding the indication.

The events 326A, 328A, 330A, 332A are collectively referred to in FIG. 3A as the PUR configuration release procedure 370A.

In some implementations, the PUR configuration can be associated with one or more cells. That is, the PUR configuration is only valid when the UE 102 camps on or (re)selects a serving cell in the cell(s). In some implementations, the CU 172 can include a cell list in the RRC release message to indicate the cell(s). If the UE 102 camps on or (re)selects a serving cell not in the cell(s), the UE 102 refrains from transmitting data on PUR radio resources configured in the PUR configuration on the serving cell. In such case, the UE 102 performs a random access procedure on the serving cell (not in the cell(s)) to transmit data on the serving cell. In some implementations, the UE 102 may release the PUR configuration after camping on or (re) selecting a serving not in the cell(s). In other implementations, the UE 102 may not release the PUR configuration after camping on or (re)selecting a serving cell not in the cell(s). Thus, the UE 102 can use the PUR configuration to transmit data after camping on or (re)selecting a serving cell in the cell(s) from the serving cell not in the cell(s).

In some implementations, the DU 174 starts processing, receiving, demodulating, and/or decoding the PUR radio resources configured in the PUR configuration after receiving the UE Context Release Command message, transmitting the RRC release message or sending the UE Context Release Complete message. Thus, the DU 174 does not waste its power to process, receive, demodulate, and/decode the PUR radio resources before transmitting the RRC release message to the UE 102. In some implementations, the DU 174 may assign radio resources for uplink transmission(s), which partially or completely overlap with the PUR radio resources, to the UE 102 or other UE(s), after providing the PUR configuration to the CU 172 and before receiving the UE Context Release Command message, transmitting the RRC release message or sending the UE Context Release Complete message. For example, the DU 174 can send one or more downlink control information commands (DCIs) on PDCCH(s) to the UE 102 or other UE(s) to assign the radio resources for uplink transmission(s). Thus, the DU 172 can efficiently use its radio resources for uplink transmission(s) from the UE 102 or the other UE(s) before transmitting the RRC release message to the UE 102.

In other implementations, the DU 174 starts processing, receiving, and/or decoding the PUR radio resources configured in the PUR configuration after receiving a HARQ acknowledge or RLC acknowledge PDU from the UE 102. Thus, the DU 174 does not waste its power to process, receive, and/decode the PUR radio resources before receiving the HARQ acknowledge or RLC acknowledge PDU from the UE 102. In some implementations, the DU 174 may assign radio resources for uplink transmission(s), which partially or completely overlap with the PUR radio resources, to the UE 102 or other UE(s), after providing the PUR configuration to the CU 172 and before receiving the HARQ acknowledge or RLC acknowledge PDU from the UE 102. For example, the DU 174 can send one or more downlink control information commands (DCIs) on PDCCH(s) to the UE 102 or other UE(s) to assign the radio resources for uplink transmission(s). Thus, the DU 172 can efficiently use its radio resources for uplink transmission(s) from the UE 102 or the other UE(s) before receiving the HARQ acknowledge or RLC acknowledge PDU from the UE 102.

In some implementations, the DU configuration can be a CellGroupConfig IE or include configuration parameter in the CellGroupConfig IE. In other implementations, the DU configuration can include multiple configurations such as physical layer configurations, a MAC configuration, an RLC configuration. In some implementations, the PUR configuration can include parameters (i.e., fields and/or IEs) similar to parameters included in a PUR-Config IE, and/or parameters included in a ConfiguredGrantConfig IE.

In some implementations, the DU 174 can also configure preconfigured downlink resources (PDR) in the PUR configuration or in the RRC release 318A. For example, the DU 174 can include parameters for the preconfigured downlink resources in the PUR configuration or in the RRC release 318A, similar to parameters (i.e. fields/IEs) in the SPS-Config IE. In such cases, the UE 102 can communicate 324A data with the DU 172 on the preconfigured downlink resources in similar ways for communicating 324 data with the DU 172 on the PUR radio resources as described above. For example, "PUR" can be changed to "PDR" in the description above.

Referring next to FIG. 3B, a scenario 300B depicts a PUR configuration scenario, similar to the scenario 300A. In this scenario, the base station 104 includes a CU 172 and a DU 174. Events in this scenario similar to those discussed above are labeled with the same reference numbers and the examples and implementations for FIG. 3A can apply to FIG. 3B. The differences between the scenarios of FIG. 3A and FIG. 3B are discussed below.

In the scenario 300B, the CU 172 sends 315B to the DU 174 a UE Context Modification Request message which includes an RRC release message (e.g., RRCRelease message or RRCConnectionRelease message) including the PUR configuration, similar to event 314A. The DU 174 retains 317B the PUR configuration and the DU configuration in response to the UE Context Modification Request message. The difference from event 314A is that the CU 172 uses the UE Context Modification Request message to include the RRC release message instead of the UE Context Release Command message. As specified in 3GPP specification 38.473 and 37.473, the DU 172 releases all signaling and user plane data transport resources related to the UE 102, including the PUR configuration and DU configuration, in response to the UE Context Release Command message. By using the UE Context Modification Request message to transmit the RRC release message instead of the UE Context Release Command message (specified in 3GPP specification 38.401), the CU 172 makes the DU 174 retain the PUR configuration and DU configuration. The DU 174 is also enhanced to transmit the RRC release message when receiving the RRC release message in the UE Context Modification Request message.

In some implementations, the DU 174 suspends or stops operation associated with the DU configuration in response to the UE Context Modification Request message. In some implementations, the DU 174 releases radio resources associated with the DU configuration in response to the UE Context Modification Request message. For example, the operation includes transmitting reference signals for the UE 102 to perform measurements or channel state information reporting. In another example, the operation includes detecting physical layer signals (e.g., channel state information and/or reference signals) transmitted by the UE 102. In yet another example, the radio resources include radio resources of the reference signals and physical layer signals. In some implementations, the CU 172 can include an indication in the UE Context Modification Request message to instruct the UE 102 to suspend/stop the operation and/or release the radio resources associated with the DU configuration. Thus, the DU 174 suspends/stops the operation and/or releases the radio resources associated with the DU configuration, in response to the indication.

In response to the UE Context Modification Request message, the DU 174 sends 321B a UE Context Modification Response message to the CU 172. In different implementations, the DU 174 can transmit 318B the RRC release message to the UE 102, before, while, or after sending 321B the UE Context Modification Response message to the CU 172. The events 315B, 317B, 318B, 321B, 322B are collectively referred to in FIG. 3B as PUR configuration procedure 361B.

After the PUR configuration procedure 361B, the UE 102, DU 174, and CU 172 can communicate 324B data, similar to event 324A. After the PUR configuration procedure 361B or after the event 324B, the UE 102, DU 174, and/or CU 172 can perform 371B a PUR configuration release procedure, similar to the PUR configuration release procedure 370A. The difference between events 330A and 331B is that the DU 174 releases the DU configuration at event 331B.

Figure 3C:
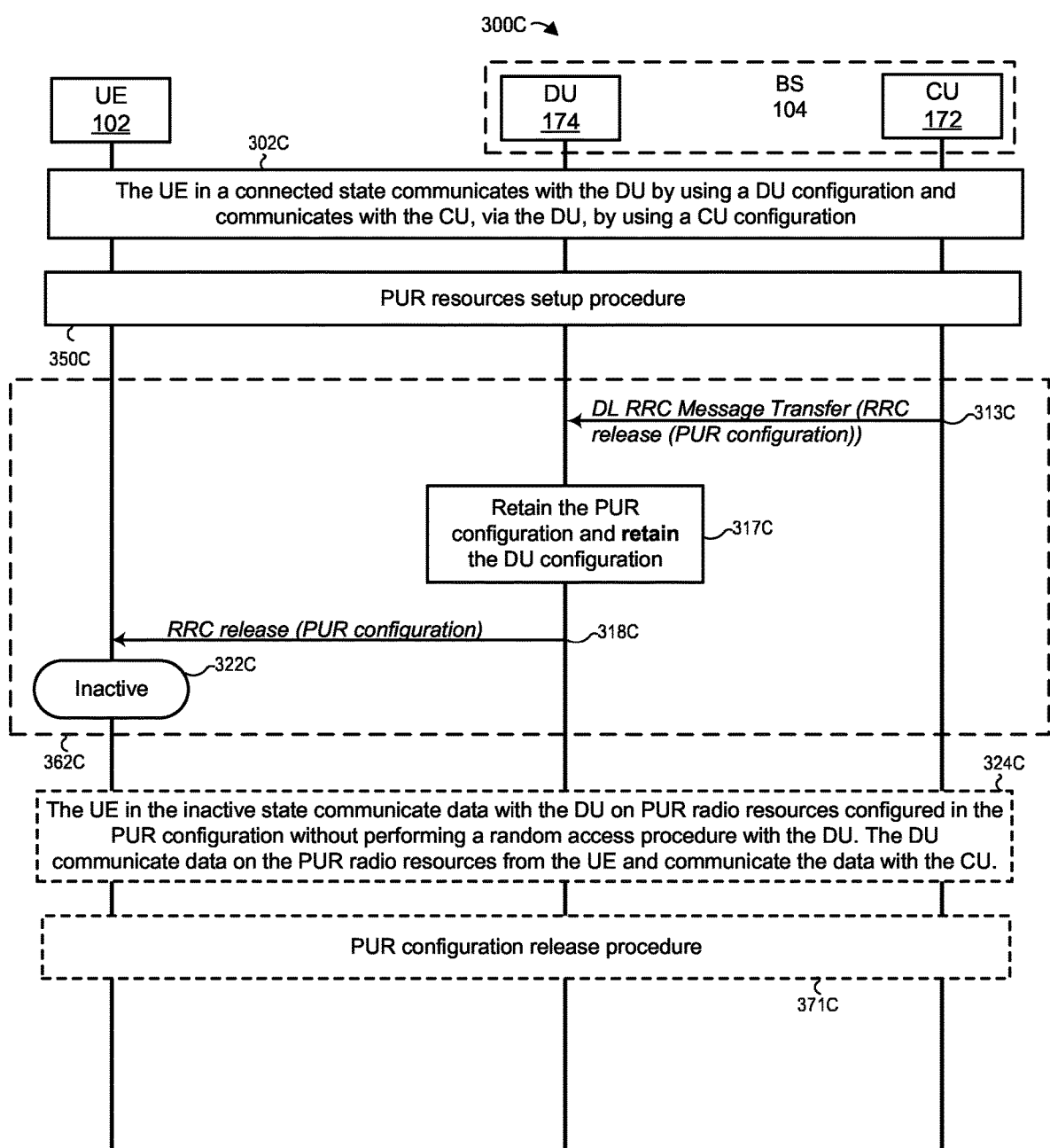
FIG. 3C is a messaging diagram of yet another example procedure for obtaining a PUR configuration for transmitting a data packet from a UE to a DU in a base station when a radio connection between the UE and the base station is inactive.

Referring next to FIG. 3C, a scenario 300C also depicts a PUR configuration scenario, similar to the scenarios 300A and 300B. In this scenario, the base station 104 includes a CU 172 and a DU 174. Events in this scenario similar to those discussed above are labeled with the same reference numbers and the examples and implementations for FIGS. 3A and 3B can apply to FIG. 3C. The differences between the scenarios of FIGS. 3A-3B and FIG. 3C are discussed below.

In the scenario 300C, the CU 172 sends 313C to the DU 174 a DL RRC Message Transfer message which includes an RRC release message (e.g., an RRCRelease message or RRCConnectionRelease message) including the PUR configuration, similar to event 314A. The DU 174 retains 317C the PUR configuration and the DU configuration in response to the DL RRC Message Transfer message. The difference from event 314A is that the CU 172 uses the DL RRC Message Transfer message to include the RRC release message instead of the UE Context Release Command message. As specified in 3GPP specification 38.473 and 37.473, the DU 174 releases all signaling and user plane data transport resources related to the UE 102, including the PUR configuration and DU configuration, in response to the UE Context Release Command message. By using the DL RRC Message Transfer message to transmit the RRC release message instead of the UE Context Release Command message (specified in 3GPP specification 38.401), the CU 172 makes the DU 174 retain the PUR configuration and DU configuration. The DU 174 is also enhanced to transmit the RRC release message when receiving the RRC release message in the DL RRC Message Transfer message.

Unlike events 314A and 315B, the DU 174 may not send a response message to the CU 172 to respond the DL RRC Message Transfer message. The events 313C, 317C, 318C, 322C are collectively referred to in FIG. 3C as PUR configuration procedure 362C.

After the PUR configuration procedure 362C, the UE 102, DU 174, and CU 172 can communicate 324C data, similar to event 324A. After the PUR configuration procedure 362C or after the event 324C, the UE 102, DU 174, and/or CU 172 can perform 371C a PUR configuration release procedure, similar to the PUR configuration release procedure 371B.

In some implementations, the DU 174 suspends or stops operation associated with the DU configuration in response to the DL RRC Message Transfer message. In some implementations, the DU 174 releases radio resources associated with the DU configuration in response to the DL RRC Message Transfer message. For example, the operation includes transmitting reference signals for the UE 102 to perform measurements or channel state information reporting. In another example, the operation includes detecting physical layer signals (e.g., channel state information and/or reference signals) transmitted by the UE 102. In yet another example, the radio resources include radio resources of the reference signals and physical layer signals. In some implementations, the CU 172 can include an indication in the DL RRC Message Transfer message to instruct the UE 102 to suspend/stop the operation and/or release the radio resources associated with the DU configuration. Thus, the DU 174 suspends/stops the operation and/or releases the radio resources associated with the DU configuration, in response to the indication.

Figure 3D:
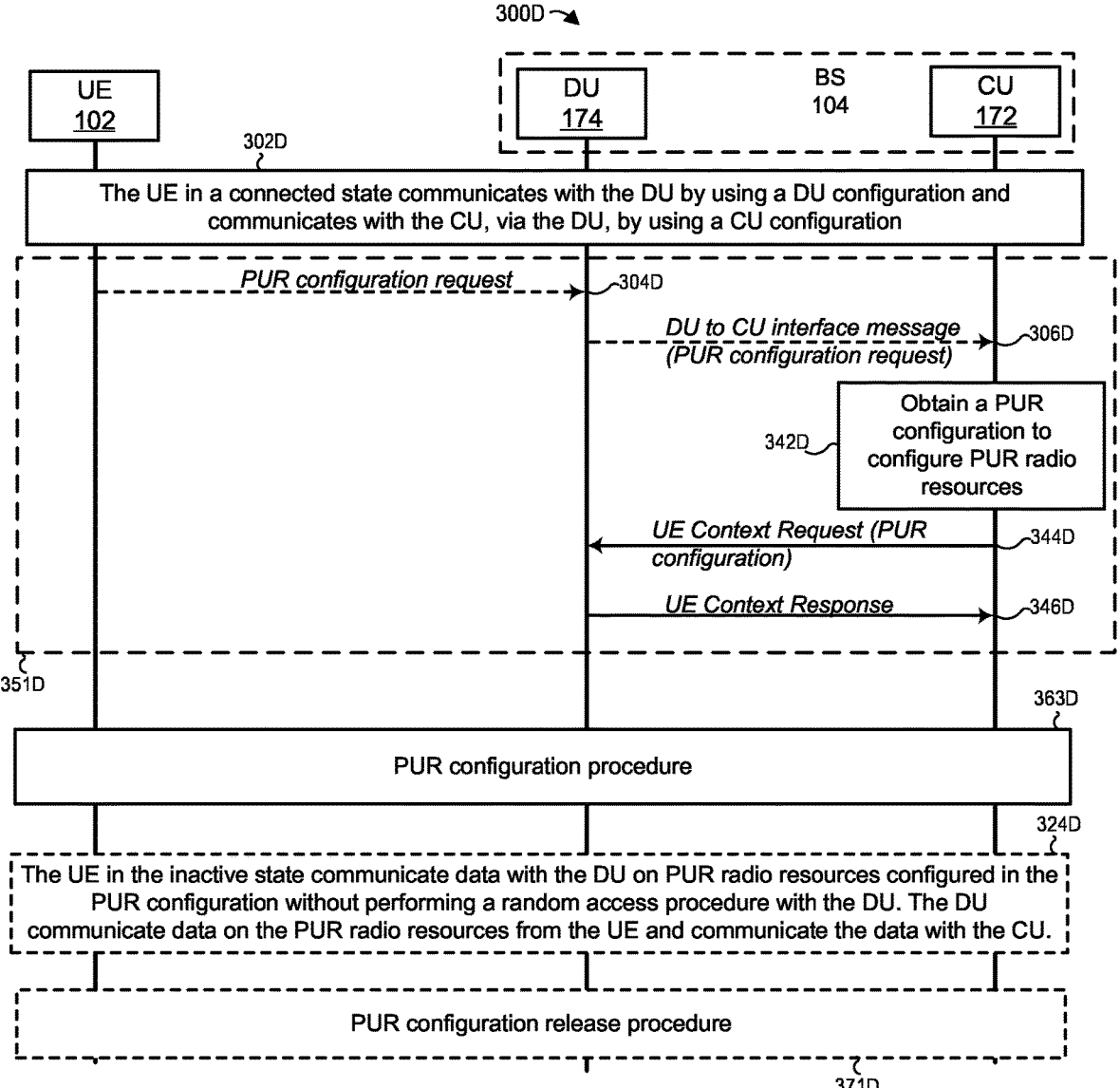
FIG. 3D is a messaging diagram of another example procedure for obtaining a PUR configuration for transmitting a data packet from a UE to a DU in a base station when a radio connection between the UE and the base station is inactive.

Referring next to FIG. 3D, a scenario 300D still depicts a PUR configuration scenario, similar to scenarios 300A, 300B and 300C. In this scenario, the base station 104 includes a CU 172 and a DU 174. Events in this scenario similar to those discussed above are labeled with the same reference numbers and the examples and implementations for FIGS. 3A-3C can apply to FIG. 3D. The differences between the scenarios of FIGS. 3A-3C and FIG. 3D are discussed below.

Instead of obtaining a PUR configuration from the DU 174, the CU 172 generates or obtains 342D a PUR configuration configuring PUR radio resources and sends 344D to the DU 174 a UE Context Request message (e.g., a UE Context Modification Request message) including the PUR configuration. In response, the DU 174 can send 346D a UE Context Response message (e.g., a UE Context Modification Response message) to the CU 172. Alternatively, the CU 172 can send 344D a new CU to DU interface message including the PUR configuration instead of the UE Context Request message. In response, the CU 172 may send 346D a new DU to CU interface message to the CU 172.

In some implementations, the CU 172 generates the PUR configuration at event 342D upon or before receiving 306D the PUR configuration request message. In other implementations, the CU 172 can store a list of one or more preconfigured PUR configuration(s) and the DU 174 can obtain the PUR configuration from the list at event 342D.

The events 304D (optional), 306D (optional), 342D, 344D, 346D are collectively referred to in FIG. 3D as PUR resources setup procedure 351D.

After the PUR resources setup procedure 351D, the CU 172, DU 174, and the UE 102 perform 363D a PUR configuration procedure similar to the PUR configuration procedure 360A, 361B or 362C. After the PUR configuration procedure 363D, the UE 102, DU 174, and CU 172 can transmit data 324D, similar to event 324A. After the PUR configuration procedure 363D or the event 324D, the UE 102, DU 174 and/or CU 172 may perform 371D a PUR configuration release procedure similar to the PUR configuration release procedure 370A or 371B.

In some implementations, the CU 172 can also configure preconfigured downlink resources in the PUR configuration or in the RRC release in the PUR configuration procedure 363D. For example, the CU 172 can include parameters for the preconfigured downlink resources in the PUR configuration or in the RRC release in the PUR configuration procedure 363D, similar to parameters (i.e., fields/IEs) in the SPS-Config IE.

Figure 4A:
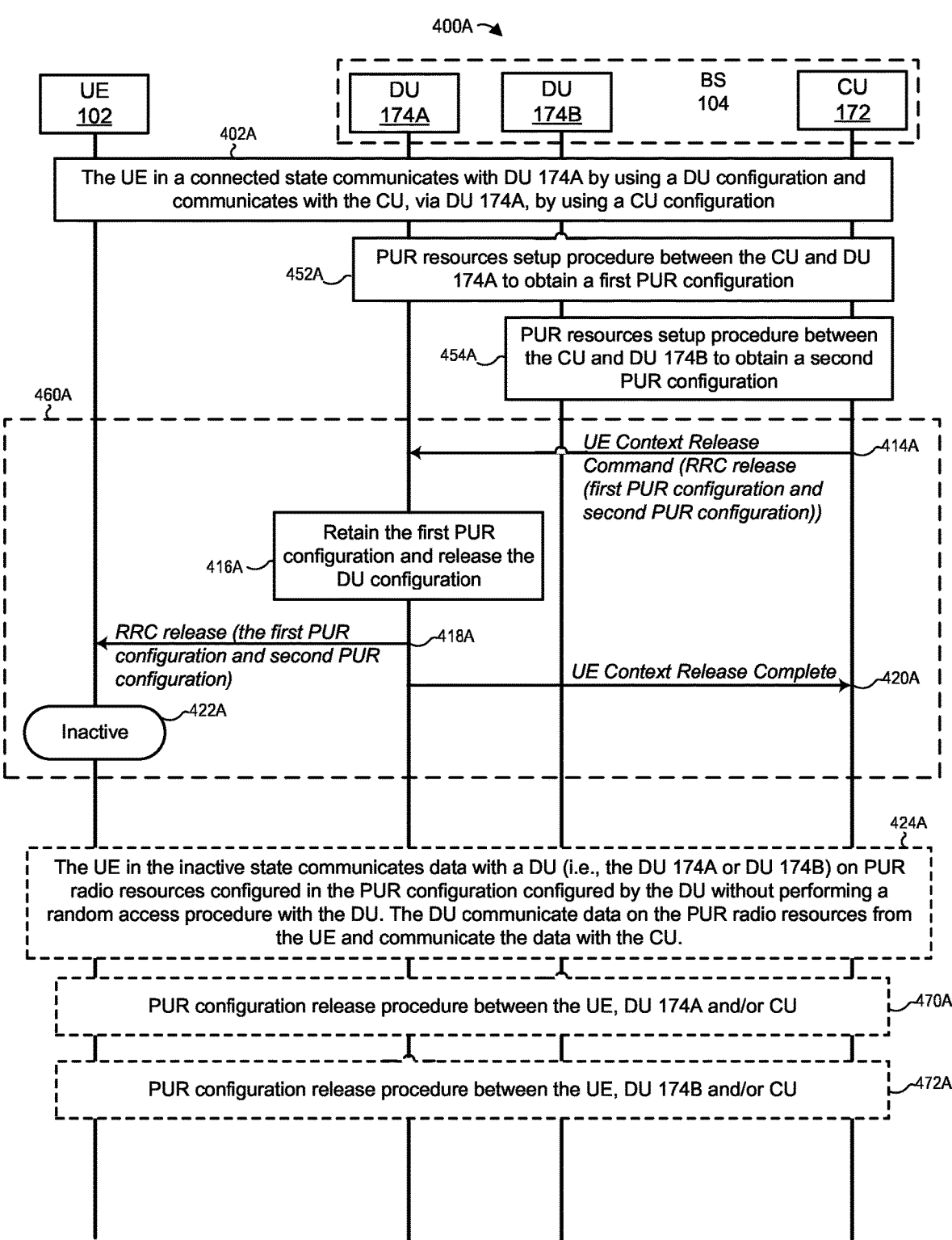
FIG. 4A is a messaging diagram of an example procedure for obtaining a first and second PUR configuration for transmitting data packets from a UE to a first and second respective DU in a base station when a radio connection between the UE and the base station is inactive.

Referring now to FIG. 4A, a scenario 400A depicts early data transmission with two PUR configurations, similar to scenarios 300A-D. In this scenario, the base station 104 includes a CU 172, a DU 174A, and a DU 174B. Events in this scenario similar to those discussed above are labeled with similar reference numbers and the examples and implementations for FIGS. 3A-3D can apply to FIG. 4A (e.g., events 302A-D are similar to event 402A; event 360A is similar to event 460A; events 324A-D are similar to event 424A). The differences between the scenarios of FIGS. 3A-3D and FIG. 4A are discussed below.

In the scenario 400A, the UE 102 initially in a connected state 302A communicates with the DU 174A by using a DU configuration and communicates with the CU 172 via the DU 174A by using a CU configuration. Later in time, the CU 172 and DU 174A perform 452A a PUR resources setup procedure for obtaining a first PUR configuration for the UE 102, similar to the PUR resources setup procedure 350A or 351D. Later in time, the CU 172 and DU 174B also perform 454A a PUR resources setup procedure for obtaining a second PUR configuration for the UE 102, similar to the PUR resources setup procedure 350A or 351D. After obtaining the first and second PUR configurations, the CU 172 sends 414A to the DU 174A a UE Context Release Command message which includes an RRC release message (e.g., an RRCRelease message or RRCConnectionRelease message) including the first and second PUR configurations. In turn, the DU 174A transmits 418A the RRC release message to the UE 102. The UE 102 transitions 422A to the inactive state upon receiving the RRC release message. In response to the UE Context Release Command message, the DU 174A retains 416A the first PUR configuration and releases the DU configuration, and sends 420A a UE Context Release Complete message to the CU 172. Thus, the DU 174A does not release the first PUR configuration and DU configuration in response to the UE Context Release Command message.

The events 414A, 416A, 418A, 420A, 422A are collectively referred to in FIG. 4A as PUR configuration procedure 460A.

In some implementations, the DU 174B refrains from generating configurations and configuring radio resources (e.g., for the UE to transmit reference signal(s) to the DU 174B and for the DU 174B to transmit reference signal(s) to the UE 102) for the UE 102 other than the PUR configuration and PUR radio resources, in response to the PUR resources setup procedure 454A. In some implementations, the DU 174B refrains from generating a DU configuration in response to the PUR resources setup procedure 454A.

In some implementations, the CU 172 can determine to perform 454A the PUR resources setup procedure with the DU 174B based on one or more measurement results received from the UE 102 or from the DU 174A. The DU 174A can obtain the measurement result(s) from measurements on signals, control channels, or data channels received from the UE 102, for example. Particularly, the CU 172 determines that the UE 102 can receive signals from a cell operated by the DU 174B based on the measurement result(s), so that the CU 172 determines to perform 454A the PUR resources setup procedure with the DU 174B.

After the PUR configuration procedure 460A, the UE 102 may communicate 424A data with the DU 174A on first PUR radio resources configured in the first PUR configuration without performing a random access procedure with the DU 174A, while the UE 102 in the inactive state camps on or (re)selects a cell operated by the DU 174A. Thus, the DU 174A communicates 424A the data on the first PUR radio resources with the UE 102 and communicates the data with the CU 172. After the PUR configuration procedure 460A, the UE 102 transmits 424A data to the DU 174B on second PUR radio resources configured in the second PUR configuration without performing a random access procedure with the DU 174B, while the UE 102 in the inactive state camps on or (re)selects a cell operated by the DU 174B. The DU 174B receives 424A the data on the second PUR radio resources from the UE 102 and sends the data to the CU 172.

After the PUR configuration procedure 460A or after the event 424A, the UE 102, DU 174A, and/or CU 172 can perform 470A a PUR configuration release procedure, similar to the PUR configuration release procedure 370A. After the PUR configuration procedure 460A or after the event 424A, the UE 102, DU 174B, and/or CU 172 can perform 472A a PUR configuration release procedure, similar to the PUR configuration release procedure 370A.

In some implementations, the first and second PUR configurations can configure the same or different PUR radio resources. In some implementations, the CU 172 can skip 452A the PUR resources setup procedure. Thus, the CU 172 includes the second PUR configuration in the RRC release message but does not include the first PUR configuration. In other implementations, the CU 172 can perform additional PUR resource setup procedure(s) with additional DU(s) to obtain one or more additional PUR configurations. Then, the CU 172 includes the additional PUR configuration(s) in the RRC release message 418A. Thus, the UE 102 may transmit 424A data to the additional DU on PUR radio resources configured in the additional PUR configuration without performing a random access procedure with the additional DU, while the UE 102 in the inactive state camps on or (re)selects a cell operated by the additional DU.

Figure 4B:
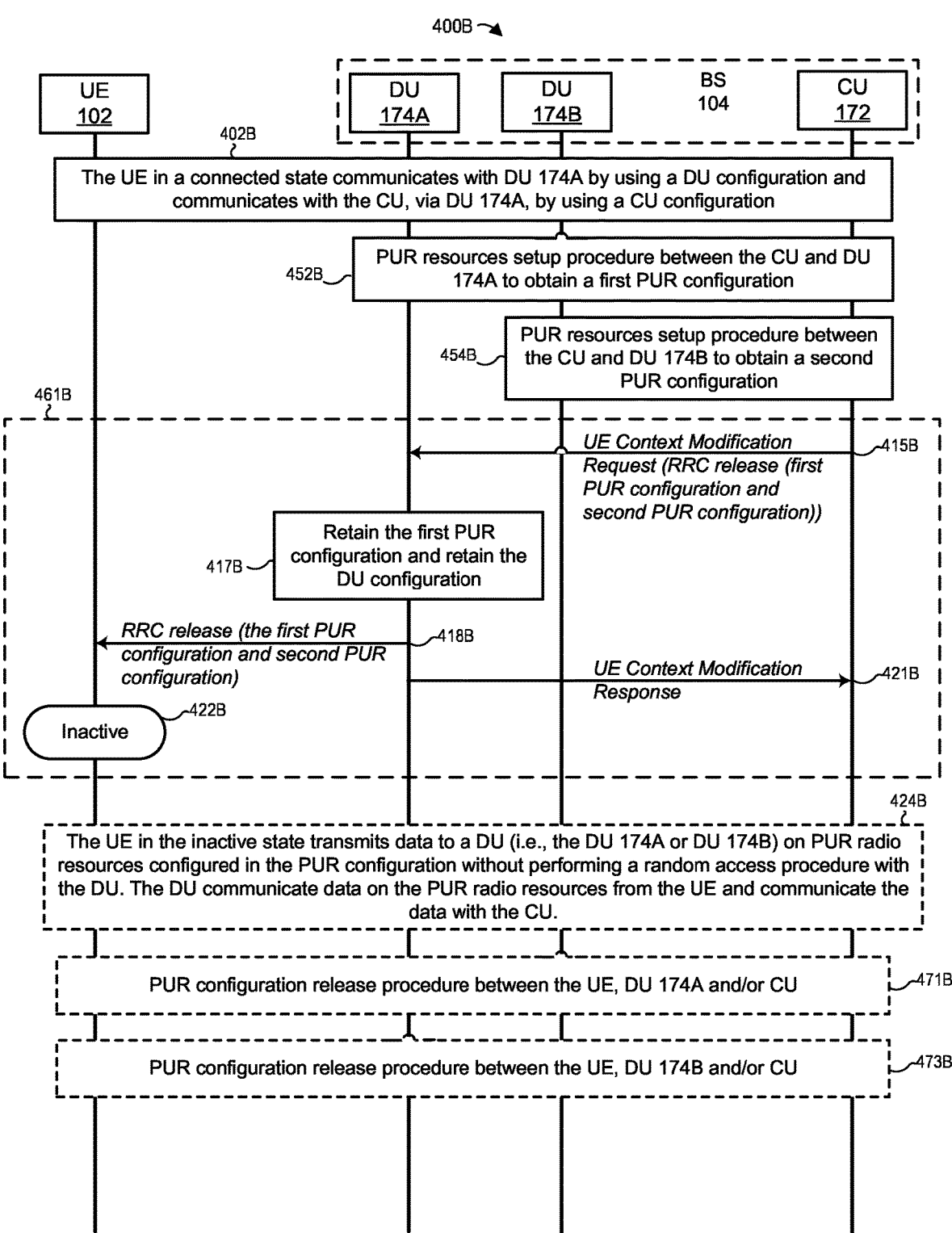
FIG. 4B is a messaging diagram of another example procedure for obtaining a first and second PUR configuration for transmitting data packets from a UE to a first and second respective DU in a base station when a radio connection between the UE and the base station is inactive.

Referring next to FIG. 4B, a scenario 400B depicts a PUR configuration scenario, similar to the scenario 400A and 300B. In this scenario, the base station 104 includes a CU 172, a DU 174A, and a DU 174B. Events in this scenario similar to those discussed above are labeled with similar reference numbers and the examples and implementations for FIGS. 3A-D and 4A can apply to FIG. 4B (e.g., events 302A-D and 402A are similar to event 402B; event 452A is similar to event 452B, event 454A is similar to event 454B, event 361B is similar to event 461B; event 424A is similar to event 424B). The differences among the scenarios of FIGS. 3-D, FIG. 4A and FIG. 4B are discussed below.

In the scenario 400B, the CU 172 sends 415B to the DU 174A a UE Context Modification Request message which includes an RRC release message (e.g., RRCRelease message or RRCConnectionRelease message) including the first and second PUR configurations, similar to event 414A and 315B. The DU 174A retains 417B the first PUR configuration and the DU configuration in response to the UE Context Modification Request message. The difference from event 414A is that the CU 172 uses the UE Context Modification Request message to include the RRC release message instead of the UE Context Release Command message. As specified in 3GPP specification 38.473 and 37.473, the DU 174A releases all signaling and user plane data transport resources related to the UE 102, including the first PUR configuration and DU configuration, in response to the UE Context Release Command message. By using the UE Context Modification Request message to transmit the RRC release message instead of the UE Context Release Command message (specified in 3GPP specification 38.401), the CU 172 makes the DU 174A retain the first PUR configuration and DU configuration. The DU 174A is also enhanced to transmit the RRC release message when receiving the RRC release message in the UE Context Modification Request message.

In response to the UE Context Modification Request message, the DU 174A sends 421B a UE Context Modification Response message to the CU 172. In different implementations, the DU 174 can transmit 418B the RRC release message to the UE 102, before, while, or after sending 421B the UE Context Modification Response message to the CU 172. The events 415B, 417B, 418B, 421B, 422B are collectively referred to in FIG. 4B as PUR configuration procedure 461B.

After the PUR configuration procedure 461B, the UE 102, DU 174 (i.e., the DU 174A or 174B) and CU 172 can communicate 424B data, similar to event 424A. After the PUR configuration procedure 461B or after the event 424B, the UE 102, DU 174A, and/or CU 172 can perform 471B a PUR configuration release procedure, similar to the PUR configuration release procedure 371B. After the PUR configuration procedure 461B or after the event 424B, the UE 102, DU 174B, and/or CU 172 can perform 473B a PUR configuration release procedure, similar to the PUR configuration release procedure 371B.

Figure 4C:
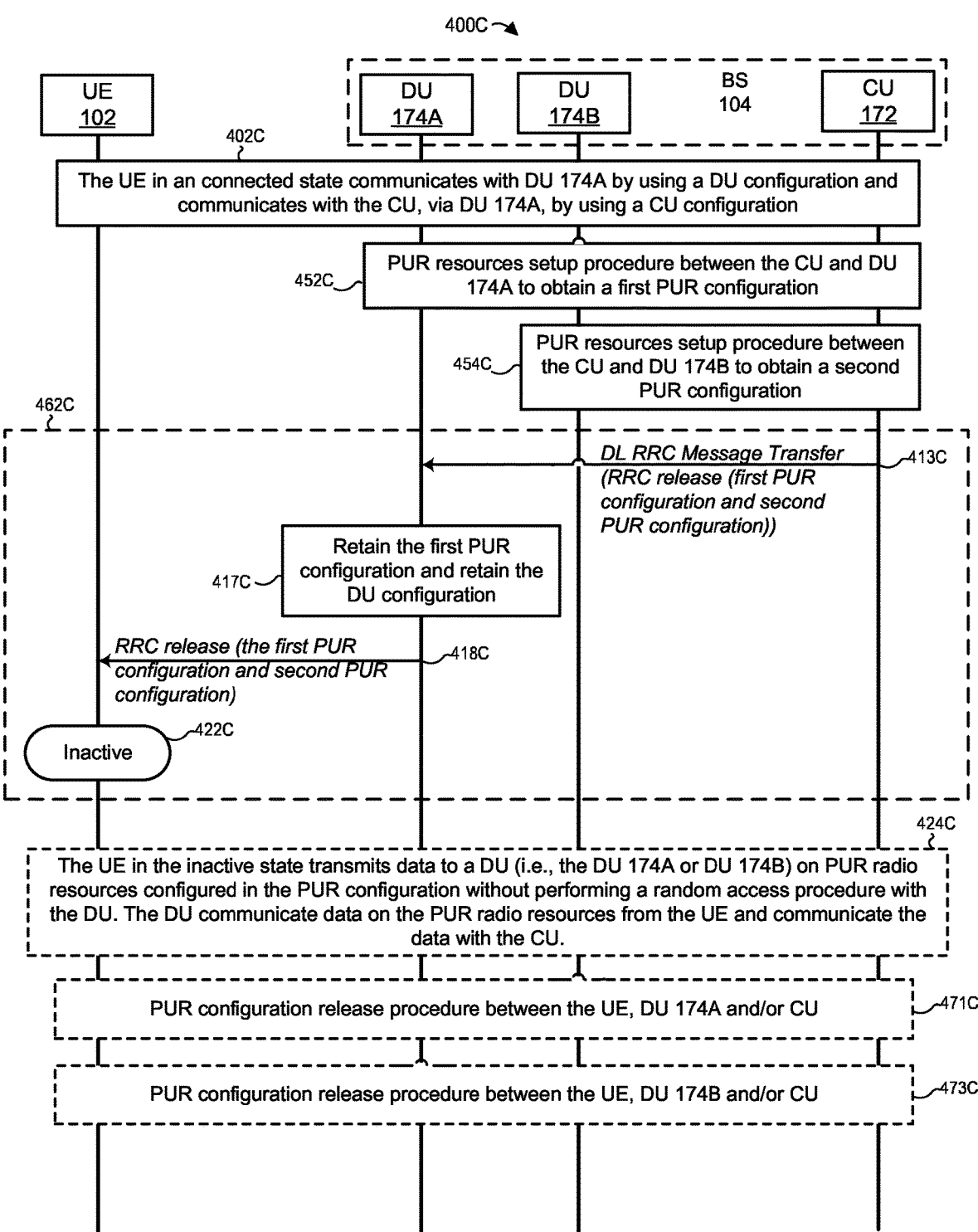
FIG. 4C is a messaging diagram of yet another example procedure for obtaining a first and second PUR configuration for transmitting data packets from a UE to a first and second respective DU in a base station when a radio connection between the UE and the base station is inactive.

Referring next to FIG. 4C, a scenario 400C depicts a PUR configuration scenario, similar to the scenario 400A-B and 300C. In this scenario, the base station 104 includes a CU 172, a DU 174A, and a DU 174B. Events in this scenario similar to those discussed above are labeled with the same reference numbers and the examples and implementations for FIGS. 3A-D and 4A-B can apply to FIG. 4C (e.g., events 302A-D and 402A are similar to event 402C; event 452A is similar to event 452C, event 454A is similar to event 454C, event 362C is similar to event 462C; event 424A is similar to event 424C). The differences among the scenarios of FIGS. 3-D, FIG. 4A-B and FIG. 4C are discussed below.

In the scenario 400C, the CU 172 sends 413C to the DU 174A a DL RRC Message Transfer message which includes an RRC release message (e.g., an RRCRelease message or RRCConnectionRelease message) including the first and second PUR configurations, similar to event 414A and 313C. The DU 174A retains 417C the first PUR configuration and the DU configuration in response to the DL RRC Message Transfer message. The difference from event 414A is that the CU 172 uses the DL RRC Message Transfer message to include the RRC release message instead of the UE Context Release Command message. As specified in 3GPP specification 38.473 and 37.473, the DU 174A releases all signaling and user plane data transport resources related to the UE 102, including the first PUR configuration and DU configuration, in response to the UE Context Release Command message. By using the DL RRC Message Transfer message to transmit the RRC release message instead of the UE Context Release Command message (specified in 3GPP specification 38.401), the CU 172 makes the DU 174A retain the first PUR configuration and DU configuration. The DU 174A is also enhanced to transmit the RRC release message when receiving the RRC release message in the DL RRC Message Transfer message.

Unlike events 414A and 415B, the DU 174A may not send a response message to the CU 172 to respond the DL RRC Message Transfer message. The events 413C, 417C, 418C, 422C are collectively referred to in FIG. 4C as PUR configuration procedure 462C.

After the PUR configuration procedure 462C, the UE 102, DU 174 (i.e., the DU 174A or 174B) and CU 172 can communicate 424C data, similar to event 424A. After the PUR configuration procedure 462C or after the event 424C, the UE 102, DU 174A, and/or CU 172 can perform 471C a PUR configuration release procedure, similar to the PUR configuration release procedure 371C. After the PUR configuration procedure 462C or after the event 424C, the UE 102, DU 174B, and/or CU 172 can perform 473C a PUR configuration release procedure, similar to the PUR configuration release procedure 371C.

Figure 5:
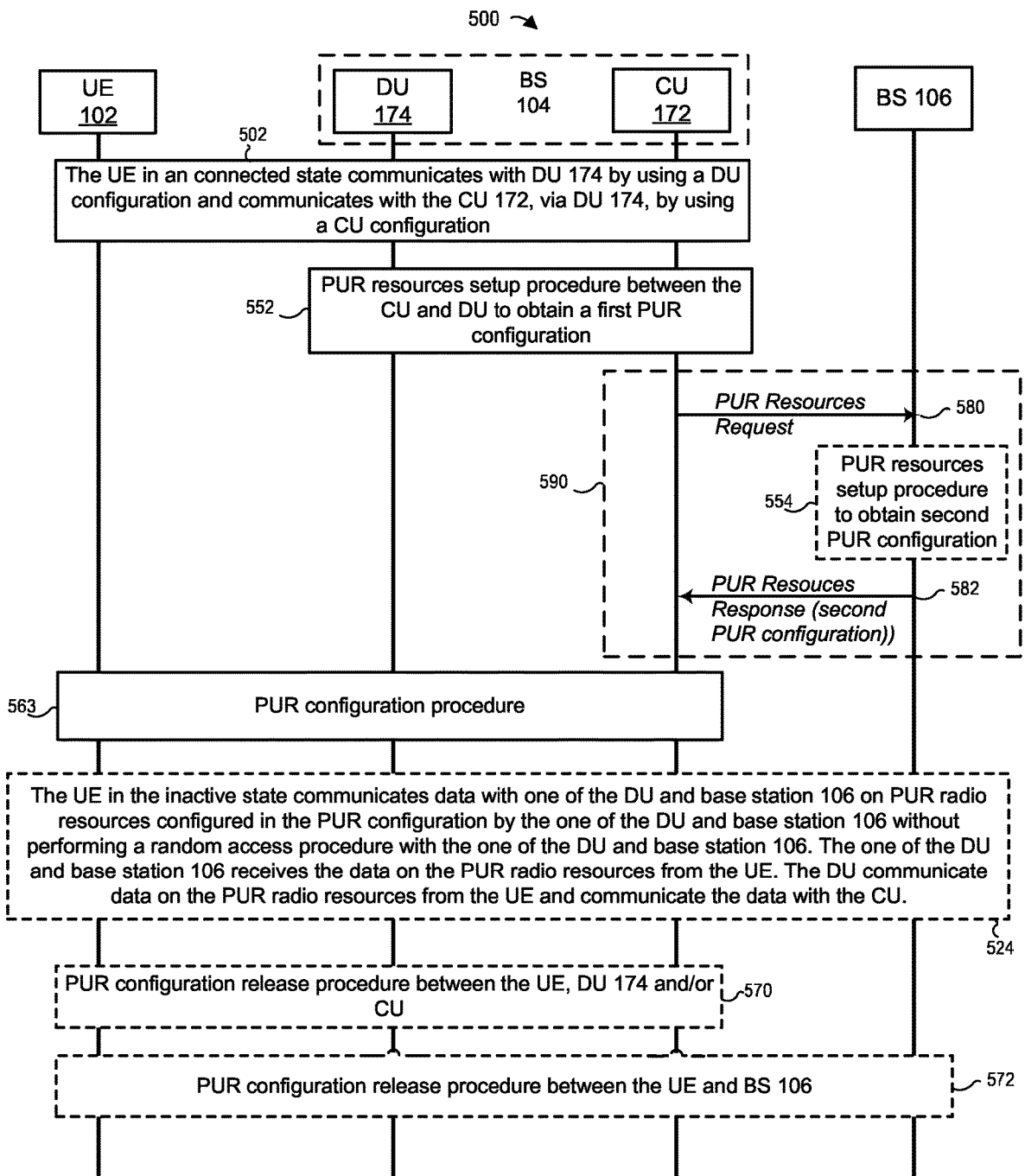
FIG. 5 is a messaging diagram of an example procedure for obtaining a first and second PUR configuration for transmitting data packets from a UE to a first DU in a first base station and a second base station, respectively, when a radio connection between the UE and the base stations is inactive.

Referring now to FIG. 5, a scenario 500A depicts a PUR configuration scenario, similar to scenarios 300A-D and 400A-C. In this scenario, the base station 104 includes a CU 172 and a DU 174. Events in this scenario similar to those discussed above are labeled with similar reference numbers and the examples and implementations for FIGS. 3A-3D, 4A-4D can apply to FIG. 5 (e.g., events 302A-D, 402A-D are similar to event 502; events 324A-D, 424A-D are similar to event 524). The differences between the scenarios of FIGS. 3A-3D, 4A-4D and FIG. 5 are discussed below.

In the scenario 500, the CU 172 performs 552 a PUR resources setup procedure with the DU 174 to obtain a first PUR configuration for the UE 102 operating in the connected state, similar to the PUR resources setup procedure 350A or 351D. Before, during or after the PUR resources setup procedure 552, the CU 172 can perform 590 a PUR configuration preparation procedure with base station 106. In the procedure 590, the CU 172 sends 580 a PUR Resource Request message to request the base station 106 to configure PUR radio resources for the UE 102. In response, the base station 106 can send 582 a PUR Resources Response message including a second PUR configuration. In some implementations, if the base station 106 includes a CU and a DU, the CU of the base station 106 can perform 554 a PUR resources setup procedure with the DU of the base station 106 to obtain the second PUR configuration, similar to the PUR resources setup procedure 350A or 351D.

After obtaining the first and second PUR configurations, the CU 172, DU 174, and the UE 102 perform 563 a PUR configuration procedure similar to the PUR configuration procedure 460A, 461B, or 462C. After the PUR configuration procedure 563, the UE 102 can communicate 524 data with the DU 174 on first PUR radio resources configured in the first PUR configuration without performing a random access procedure with the DU 174, while the UE 102 in the inactive state camps on or (re)selects a cell operated by the DU 174. Thus, the DU 174 communicates 524 the data on the first PUR radio resources with the UE 102 and sends the data to the CU 172. After obtaining the first and second PUR configurations, the UE 102 can communicate 524 data with the base station 106 on second PUR radio resources configured in the second PUR configuration without performing a random access procedure with the base station 106 (or the DU of the base station 106), while the UE 102 in the inactive state camps on or (re)selects a cell operated by the base station 106 (or the DU of the base station 106). The base station 106 (or the DU of the base station 106) communicate 524 the data on the second PUR radio resources with the UE 102. In the case of the DU of the base station 106, the DU communicates 524 the data with the CU 172.

After the PUR configuration procedure 563 or after the event 524, the UE 102, DU 174, and/or CU 172 can perform 570 a PUR configuration release procedure, similar to the PUR configuration release procedure 370A or 371B. After the PUR configuration procedure 563 or after the event 524, the UE 102 and base station 106 can perform 572 a PUR configuration release procedure, similar to the PUR configuration release procedure 370A or 371B.

Next, several example methods, that can be implemented in the UE, in one or more base stations, DUs or CUs or in a RAN to support data communications in the inactive state with a preconfigured uplink grant configuration, are discussed next with reference to FIGS. 6-13.

FIG. 6 illustrates an example method 600 for obtaining a PUR configuration and transmitting an RRC release message including the PUR configuration to a UE, which can be implemented in a base station DU 174(A) of FIGS. 3A, 3D, 4A, and 5, for example.

The method 600 begins at block 602, where the DU obtains a PUR configuration to configure PUR radio resources for a UE (e.g., events 310A of FIG. 3A, 344D of FIG. 3D, 452A or 454A of FIG. 4A, 552 of FIG. 5). At block 604, the DU may transmit the PUR configuration to a CU (e.g., events 312A of FIG. 3A, 452A or 454A of FIG. 4A, 552 of FIG. 5). The DU, at block 606, receives from the CU a UE Context Release Command message including an RRC release message (e.g., events 314A of FIG. 3A, 363D of FIG. 3D, 414A of FIG. 4A, 515 of FIG. 5). The DU at block 608 retains the PUR configuration and releases the DU configuration, in response to the UE Context Release Command message (e.g., events 316A of FIG. 3A, 363D of FIG. 3D, 416A of FIG. 4A, 516 of FIG. 5). At block 610, the DU transmits the RRC release message to the UE (e.g., events 318A of FIG. 3A, 363D of FIG. 3D, 418A of FIG. 4A, 518 of FIG. 5). At block 612, the DU may receive data on the PUR radio resources from the UE (e.g. events 324A of FIG. 3A, 324D of FIG. 3D, 424A of FIG. 4A, 524 of FIG. 5).

FIG. 7 illustrates an example method 700 for obtaining a PUR configuration and transmitting an RRC release message including the PUR configuration to a UE, which can be implemented in a base station CU 172 of FIGS. 3B-D, 4B-C, 5 for example.

The method 700 begins at block 702, where the CU obtains at least one PUR configuration to configure PUR radio resources for a UE (e.g., events 350B of FIG. 3B, 350C of FIG. 3C, 342D of FIG. 3D, 452B or 454B of FIG. 4B, 452C or 454C of FIG. 4C, 552 or 590 of FIG. 5). At block 704, the CU determines to transition the UE from a connected state to an inactive state (e.g., events 361B of FIG. 3B, 362C of FIG. 3C, 363D of FIG. 3D, 461B of FIG. 4B, 463C of FIG. 4C, 563 of FIG. 5). At block 706, the CU generates an RRC release message including the at least one PUR configuration for the UE in response to the determination (e.g., events 315B of FIG. 3B, 313C of FIG. 3C, 363D of FIG. 3D, 415B of FIG. 4B, 413C of FIG. 4C, 563 of FIG. 5). At block 708, the CU includes the RRC release message in a CU to DU interface message other than a UE Context Release Command message (e.g., events 315B of FIG. 3B, 313C of FIG. 3C, 363D of FIG. 3D, 415B of FIG. 4B, 413C of FIG. 4C, 563 of FIG. 5). The CU at block 710 transmits the CU to DU interface message to the DU (e.g., events 315B of FIG. 3B, 313C of FIG. 3C, 363D of FIG. 3D, 415B of FIG. 4B, 413C of FIG. 4C, 563 of FIG. 5).

FIG. 8 illustrates an example method 800 for transmitting an RRC release message including a PUR configuration to a UE, which can be implemented in a base station CU 172 of FIGS. 3A-D, 4A-C, 5 for example.

The method 800 begins at block 802, where the CU determines to transmit an RRC release message to instruct a UE to transition from a connected state to an inactive state (e.g., events 361B of FIG. 3B, 362C of FIG. 3C, 363D of FIG. 3D, 461B of FIG. 4B, 463C of FIG. 4C, 563 of FIG. 5). At block 804, if the RRC release message generated at block 802 includes a PUR configuration for the UE, the flow proceeds to block 806 where the CU includes the RRC release message in a CU to DU interface message other than a UE Context Release Command message and then sends the CU to DU interface message to a DU at block 808 (e.g. events 315B of FIG. 3B, 313C of FIG. 3C, 415B of FIG. 4B, 413C of FIG. 4C, FIG. 563 of FIG. 5). At block 804, if the RRC release message generated at block 802 does not include a PUR configuration for the UE, the flow proceeds to block 810 where the CU includes the RRC release message in a UE Context Release Command message and then sends the UE Context Release Command message to a DU at block 812.

FIG. 9 illustrates an example method 900 for receiving PUR configuration(s) for a UE from DU(s) and generating an RRC release message including the PUR configuration(s) which can be implemented in a base station CU 172 of FIGS. 3A-C, 4A-C, 5, for example.

The method 900 begins at block 902, where the CU receives from DU(s) PUR configuration(s) to configure PUR radio resources for the UE (e.g., events 350A of FIG. 3A, 350B of FIG. 3B, 350C of FIG. 3C, 452A or 454A of FIG. 4A, 452B or 454B of FIG. 4B, 452C or 454C of FIG. 4C, 552 of FIG. 5). At block 904, the CU generates an RRC release message including the PUR configuration(s) for the UE and transmits the RRC release message to the UE via the DU at block 906 (e.g., events 314A of FIG. 3A, 315B of FIG. 3B, 313C of FIG. 3C, 414A of FIG. 4A, 415B of FIG. 4B, 415C of FIG. 4C, 515 of FIG. 5, 766 of FIG. 7).

FIG. 10A illustrates an example method 1000A for determining to transmit data on PUR radio resources or in a Message 3 or Message A of a random access procedure, which can be implemented in the UE 102 of FIGS. 3A-D, 4A-C, 5, for example.

The method 1000A begins at block 1002A, where the UE receives from a RAN an RRC release message including one or more PUR configurations associated with a list of one, two, or more allowed cells (e.g., event 318A of FIG. 3A, 318B of FIG. 3B, 318C of FIG. 3C, 363D of FIG. 3D, 418A of FIG. 4A, 418B of FIG. 4B, 418C of FIG. 4C, 518 of FIG. 5). At block 1004A, the UE transitions to an inactive state in response to the RRC release message (e.g., event 322A of FIG. 3A, 322B of FIG. 3B, 322C of FIG. 3C, 363D of FIG. 3D, 422A of FIG. 4A, 422B of FIG. 4B, 422C of FIG. 4C, 522 of FIG. 5). At block 1006A, the UE determines to transmit data while operating in an inactive state. At block 1008A, if the current serving cell is in the list associated with the PUR configuration(s), the flow proceeds to block 1010A where the UE transmits to the RAN the data on PUR radio resources configured in the PUR configuration associated with the current serving cell without performing a random access procedure with the RAN (e.g., events 324A of FIG. 3A, 324B of FIG. 3B, 324C of FIG. 3C, 324D of FIG. 3D, 424A of FIG. 4A, 424B of FIG. 4B, 424C of FIG. 4C, 524 of FIG. 5). At block 1008A, if the current serving cell is not in the list associated with the PUR configuration(s), the flow proceeds to block 1012A where the UE performs a random access procedure on the current serving cell with the RAN and then transmits the data on a Message 3 or Message A of the random access procedure at block 1014A.

If the random access procedure is a four-step random access procedure, the UE transmits a random access preamble to the RAN and receives a random access response from the RAN to respond the random access preamble. The RAN assigns radio resources for the Message 3 in the random access response. Thus, the UE transmits the data in the Message 3 on the radio resources. If the random access procedure is a two-step random access procedure, the UE transmits a random access preamble and the data in the Message A to the RAN. The RAN assigns radio resources for the Message A in system information broadcast by the RAN on the current serving cell. The UE receives the system information before transmitting the Message A. Thus, the UE transmits the data in the Message A on the radio resources.

Figure 10B:
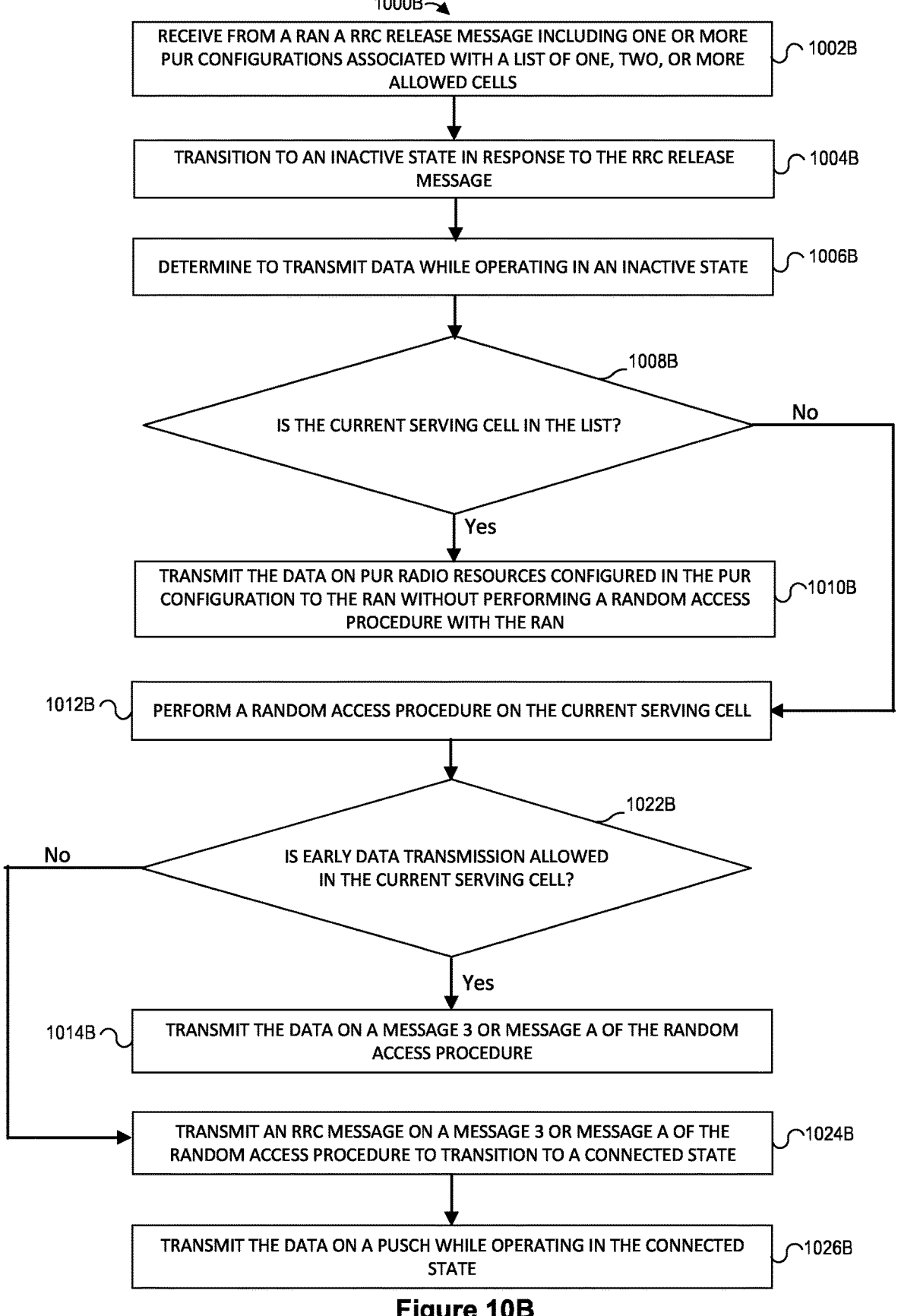
FIG. 10B is a flow diagram of another example method for determining whether a current serving cell for a UE is in a list of cells having preconfigured resources when performing early data transmission procedures with a base station, which can be implemented in the UE of FIG. 1A.

FIG. 10B illustrates another example method 1000B for determining to transmit data on PUR radio resources or in a Message 3 or Message A of a random access procedure, which can be implemented in the UE 102 of FIGS. 3A-D, 4A-C, 5, for example.

The method 1000B is similar to the method 1000A. Blocks 1002B, 1004B, 1006B, 1008B, 1010B, 1012B are the same as blocks 1002A, 1004A, 1006A, 1008A, 1010A, 1012A. After performing the random access procedure at block 1012B, if the early data transmission is allowed in the current serving cell at block 1022B, the flow proceeds to block 1014B where the UE transmits data on a Message 3 or Message A of the random access procedure. At block 1022B, if the early data transmission is not allowed in the current serving cell, the flow proceeds to block 1024B where the UE transmits an RRC message on a Message 3 or Message A of the random access procedure to transition to a connected state. Then the UE, at block 1026B, transmits the data on a PUSCH while operating in the connected state.

In some implementations, the RRC message can be an RRC request message (e.g., an RRCResumeRequest message or RRCSetupRequest message). The UE can receive an RRC response message (e.g., an RRCResume message or RRCSetup message) from the RAN to respond the RRC request message. In response to the RRC response message, the UE transitions to the connected state and can send an RRC complete message (e.g., an RRCResumeComplete message or RRCSetupComplete message) to the RAN. In some implementations, the UE in the connected state receives, on a PDCCH from the RAN, a DCI with a CRC scrambled with an ID of the UE 102 for the DCI. The ID can be a C-RNTI. The RAN assigns the PUSCH in the DCI.

FIG. 11A illustrates another example method 1100A for determining to transmit data on PUR radio resources or in a Message 3 or Message A of a random access procedure, which can be implemented in a UE 102 of FIGS. 3A-D, 4A-C, 5, for example.

The method 1100A begins at block 1102A, where the UE receives from a RAN an RRC release message including one or more PUR configurations associated with a first list of one, two, or more radio bearers (RBs) (or logical channels) (e.g., events 318A of FIG. 3A, 318B of FIG. 3B, 318C of FIG. 3C, 363D of FIG. 3D, 418A of FIG. 4A, 418B of FIG. 4B, 418C of FIG. 4C, 518 of FIG. 5). At block 1104A, the UE transitions to an inactive state in response to the RRC release message (e.g., events 322A of FIG. 3A, 322B of FIG. 3B, 322C of FIG. 3C, 363D of FIG. 3D, 422A of FIG. 4A, 422B of FIG. 4B, 422C of FIG. 4C, 522 of FIG. 5). At block 1106A, the UE determines to transmit data while operating in an inactive state. At block 1108A, if the data is associated with a radio bearer (or a logical channel) in the first list, the flow proceeds to block 1110A where the UE transmits data to the RAN on PUR radio resources configured in the PUR configuration associated with the radio bearer (or the logical channel) without performing a random access procedure with the RAN (e.g., events 324A of FIG. 3A, 324B of FIG. 3B, 324C of FIG. 3C, 324D of FIG. 3D, 424A of FIG. 4A, 424B of FIG. 4B, 424C of FIG. 4C, 524 of FIG. 5). At block 1108A, if the data is not associated with a radio bearer (or a logical channel) in the first list, the flow proceeds to block 1112A where the UE performs a random access procedure with the RAN and transmits data on a Message 3 or Message A of the random access procedure at 1114A.

In some implementations, the UE can receive a second list which associates the PUR configuration(s) to one, two or more allowed cells as described in the method 1000A or 1000B. Thus, the UE can perform the method 1100A with the method 1000A or 1000B to determine to transmit the data on PUR radio resources configured in the PUR configuration or in a Message 3 or Message A of a random access procedure. In some implementations, the radio bearer (RB) can be an SRB or a DRB.

FIG. 11B illustrates another example method 1100B for determining to transmit data on PUR radio resources or in a Message 3 or Message A of a random access procedure, which can be implemented in a UE 102 of FIGS. 3A-D, 4A-C, 5, for example.

The method 1100B is similar to the method 1100A. Blocks 1102B, 1104B, 1106B, 1108B, 1110B, 1112B are the same as blocks 1102A, 1104A, 1106A, 1108A, 1110A, 1112A. After performing the random access procedure at block 1112B, if the data is associated with an RB (or a logical channel) configured for early data transmission, the flow proceeds to block 1114B where the UE transmits data on a Message 3 or Message A of the random access procedure. At block 1122B, if the data is not associated with an RB (or a logical channel) configured for early data transmission, the flow proceeds to block 1124B where the UE transmits an RRC message on a Message 3 or Message A of the random access procedure to transition to a connected state. Then the UE, at block 1126B, transmits the data on a PUSCH while operating in the connected state. Example implementations of the method 1000B can apply to the method 1100B.

Figure 12A:
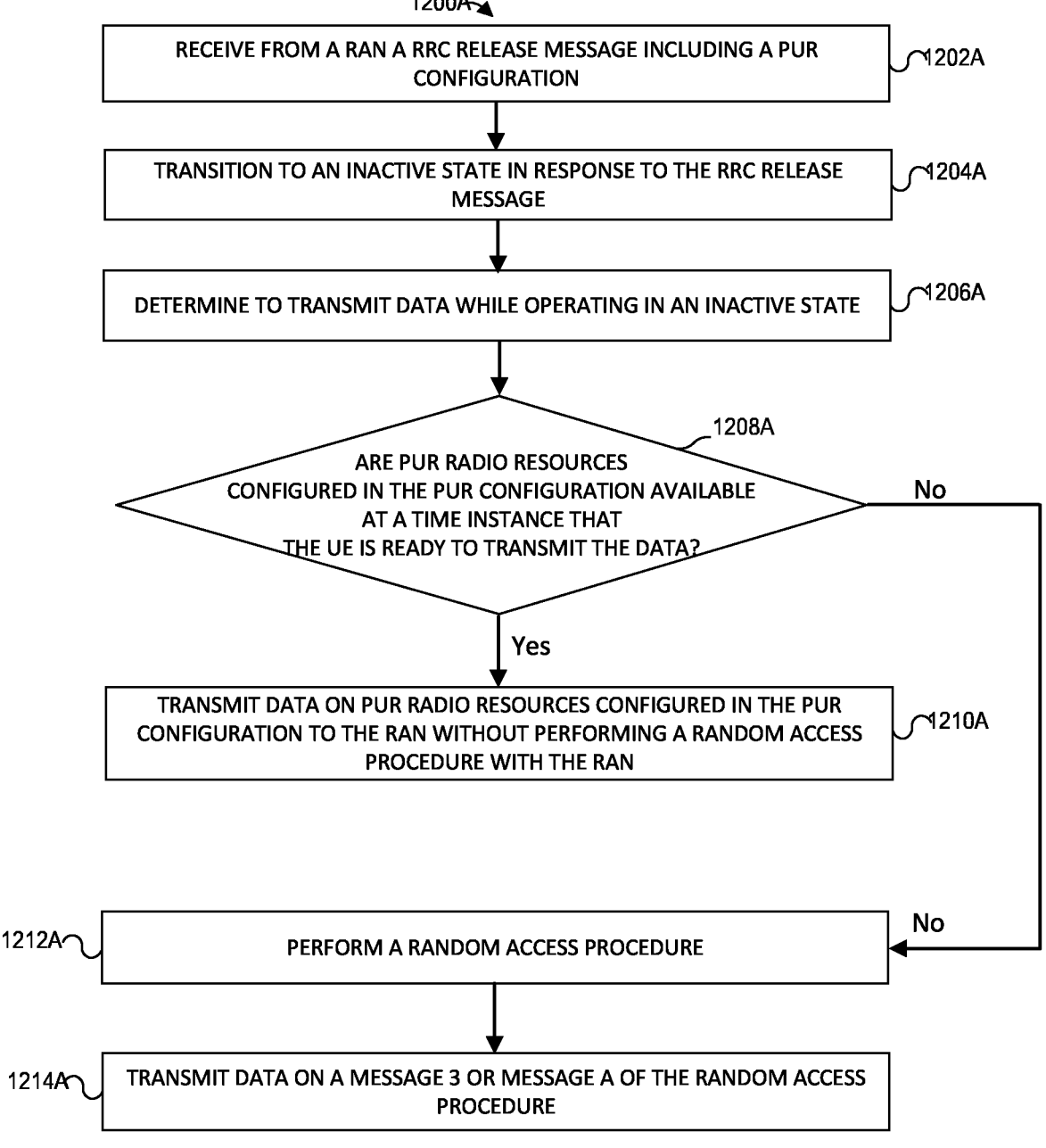
FIG. 12A is a flow diagram of an example method for determining whether a preconfigured resource is available at a time when the UE is transmitting data when performing early data transmission procedures with a base station, which can be implemented in the UE of FIG. 1A.

FIG. 12A illustrates an example method 1200A for determining to transmit data on PUR radio resources or in a Message 3 or Message A of a random access procedure, which can be implemented in the UE 102 of FIGS. 3A-D, 4A-C, 5, for example.

The method 1200A begins at block 1202A, where the UE receives from a RAN an RRC release message including a PUR configuration (e.g., events 318A of FIG. 3A, 318B of FIG. 3B, 318C of FIG. 3C, 363D of FIG. 3D, 418A of FIG. 4A, 418B of FIG. 4B, 418C of FIG. 4C, 518 of FIG. 5). At block 1204A, the UE transitions to an inactive state in response to the RRC release message (e.g., events 322A of FIG. 3A, 322B of FIG. 3B, 322C of FIG. 3C, 363D of FIG. 3D, 422A of FIG. 4A, 422B of FIG. 4B, 422C of FIG. 4C, 522 of FIG. 5). At block 1206A, the UE determines to transmit data while operating in an inactive state. At block 1208A, if the PUR radio resources configured in the PUR configuration are available at a point in time when the UE is ready to transmit the data, the flow proceeds to block 1210A where the UE transmits data on the PUR radio resources configured in the PUR configuration to the RAN without performing a random access procedure with the RAN (e.g., events 324A of FIG. 3A, 324B of FIG. 3B, 324C of FIG. 3C, 324D of FIG. 3D, 424A of FIG. 4A, 424B of FIG. 4B, 424C of FIG. 4C, 524 of FIG. 5). At block 1208A, if the PUR radio resources configured in the PUR configuration are not available at a point in time when the UE is ready to transmit the data, the flow proceeds to block 1212A where the UE performs a random access procedure with the RAN and then transmits data on a Message 3 or Message A of the random access procedure at block 1214A. Example implementations for similar blocks at FIG. 10A can apply to FIG. 12A.

FIG. 12B illustrates an example method 1200B for transmitting data on PUR radio resources, which can be implemented in a UE 102 of FIGS. 3A-D, 4A-C, 5, for example.

The method 1200B is similar to the method 1200A. Blocks 1202B, 1204B, 1206B, 1208B, 1210B are the same as blocks 1002A, 1004A, 1006A, 1008A, 1010A. At block 1208B, if the PUR radio resources configured in the PUR configuration are not available at a point in time when the UE is ready to transmit the data, the flow proceeds to block 1213B where the UE refrains from performing a random access procedure to transmit the data and the flow proceeds back to block 1208B.

FIG. 13 illustrates an example method 1300 for determining to transmit data on PUR radio resources or in a Message 3 or Message A of a random access procedure, which can be implemented in the UE 102 of FIGS. 3A-D, 4A-C, 5, for example.

The method 1300 begins at block 1302, where the UE receives from a RAN an RRC release message including a PUR configuration (e.g., events 318A of FIG. 3A, 318B of FIG. 3B, 318C of FIG. 3C, 363D of FIG. 3D, 418A of FIG. 4A, 418B of FIG. 4B, 418C of FIG. 4C, 518 of FIG. 5). At block 1304, the UE transitions to an inactive state in response to the RRC release message (e.g., events 322A of FIG. 3A, 322B of FIG. 3B, 322C of FIG. 3C, 363D of FIG. 3D, 422A of FIG. 4A, 422B of FIG. 4B, 422C of FIG. 4C, 522 of FIG. 5). At block 1306, the UE at a first point in time, has data available for transmission while operating in an inactive state. At block 1308, if PUR radio resources configured in the PUR configuration are available at a second point in time and a time gap between the first and second points in time is within a threshold time period, the flow proceeds to block 1210A where the UE transmits data on the PUR radio resources configured in the PUR configuration to the RAN without performing a random access procedure with the RAN (e.g., event 324A of FIG. 3A, 324B of FIG. 3B, 324C of FIG. 3C, 324D of FIG. 3D, 424A of FIG. 4A, 424B of FIG. 4B, 424C of FIG. 4C, 524 of FIG. 5). At block 1308, if the time gap between the first and second points in time is not within the threshold time period, the flow proceeds to block 1312 where the UE performs a random access procedure with the RAN and then transmits data on a Message 3 or Message A of the random access procedure at block 1314. Example implementations for similar blocks at FIG. 10A can apply to FIG. 13.

In some implementations, the RAN can configure the threshold time period in the RRC release message. Thus, the RAN can manage when the UE can perform a random access procedure for early data transmission. In other implementations, the UE can determine the threshold time period in accordance with one or more QoS parameters associated with the data. For example, the QoS parameter(s) include a latency parameter. The UE can set the threshold time period to a value derived from the latency parameter. Thus, the UE can ensure to transmit the data with the QoS requirements for the data.

Embodiments of the techniques described in the present disclosure may include any number of the following aspects, either alone or combination:

1. A method in a distributed unit (DU) of a base station for processing early data transmissions from a UE, the method comprising: transmitting, by processing hardware, a preconfigured uplink resource (PUR) configuration to the UE in a release message that instructs the UE to transition to an inactive state; and while the UE is in the inactive state, receiving, by the processing hardware from the UE, a data packet via a PUR resource configured in the PUR configuration.

2. The method according to aspect 1, further comprising: receiving, by the processing hardware, a PUR configuration request message from a UE while the UE and the base station are in a connected state; and transmitting, by the processing hardware, the PUR configuration request message to a central unit (CU) of the base station.

3. The method according to any one of the preceding aspects, further comprising: receiving, by the processing hardware, a message from the CU including the PUR configuration; and transmitting, by the processing hardware to the CU, a response message.

4. The method according to any one of the preceding aspects, further comprising: receiving, by the processing hardware, a PUR request message from the CU; and transmitting, by the processing hardware to the CU, a response message including the PUR configuration.

5. The method according to any one of the preceding aspects, wherein the PUR configuration request message or the PUR request message includes PUR related information, and further comprising: generating, by the processing hardware, the PUR configuration based on the PUR related information.

6. The method according to any one of the preceding aspects, wherein the release message is a second release message and further comprising: receiving, by the processing hardware, a first release message from the CU including the PUR configuration, wherein the DU transmits the second release message to the UE in response to receiving the first release message from the CU.

7. The method according to any one of the preceding aspects, wherein receiving the first release message includes receiving, by the processing hardware, a release command message from the CU including the first release message.

8. The method according to any one of the preceding aspects, further comprising: retaining, by the processing hardware, the PUR configuration; and releasing, by the processing hardware, a DU configuration.

9. The method according to any one of the preceding aspects, wherein receiving the first release message includes receiving, by the processing hardware, a modification request message from the CU including the first release message.

10. The method according to any one of the preceding aspects, wherein receiving the first release message includes receiving, by the processing hardware, a radio resource transfer message from the CU including the first release message.

11. The method according to any one of the preceding aspects, further comprising: retaining, by the processing hardware, the PUR configuration; and retaining, by the processing hardware, a DU configuration.

12. The method according to any one of the preceding aspects, wherein the PUR configuration is valid according to one or more conditions, and further comprising: in response to determining that at least one of the one or more conditions is not satisfied, releasing, by the processing hardware, the PUR configuration.

13. The method according to any one of the preceding aspects, wherein the DU is a first DU, the UE communicates with a second DU in the base station in addition to the first DU, the PUR configuration is a first PUR configuration for the first DU, and the release message is a second release message, and further comprising: receiving, by the processing hardware, a first release message from the CU including the first PUR configuration and a second PUR configuration for the second DU, wherein transmitting the second release message includes transmitting, by the processing hardware, the first PUR configuration and the second PUR configuration to the UE.

14. The method according to any one of the preceding aspects, wherein receiving the first release message includes receiving, by the processing hardware, a release command message from the CU including the first release message.

15. The method according to any one of the preceding aspects, further comprising: retaining, by the processing hardware, the first PUR configuration; and releasing, by the processing hardware, a DU configuration.

16. The method according to any one of the preceding aspects, wherein receiving the first release message includes receiving, by the processing hardware, a modification request message from the CU including the first release message.

17. The method according to any one of the preceding aspects, wherein receiving the first release message includes receiving, by the processing hardware, a radio resource transfer message from the CU including the first release message.

18. The method according to any one of the preceding aspects, further comprising: retaining, by the processing hardware, the first PUR configuration; and retaining, by the processing hardware, a DU configuration.

19. The method according to any one of the preceding aspects, wherein the DU is in a first base station, the UE communicates with a second base station in addition to the first base station, the PUR configuration is a first PUR configuration for the first base station, and the release message is a second release message, and further comprising: receiving, by the processing hardware, a first release message from the CU including the first PUR configuration and a second PUR configuration for the second base station, wherein transmitting the second release message includes transmitting, by the processing hardware, the first PUR configuration and the second PUR configuration to the UE.

20. A DU of a base station comprising processing hardware and configured a method according to any of the preceding aspects.

21. A method in a central unit (CU) of a base station for processing early data transmissions from a UE, the method comprising: determining, by processing hardware, to transition the UE in a connected state with the base station to an inactive state; generating, by the processing hardware, a release message including a preconfigured uplink resource (PUR) configuration; and transmitting, by the processing hardware, the release message to the UE via a distributed unit (DU) of the base station.

22. The method according aspect 21, further comprising: receiving, by the processing hardware, a PUR configuration request message from the DU while the UE and the base station are in the connected state.

23. The method according to either one of aspect 21 or aspect 22, further comprising: generating, by the processing hardware, the PUR configuration; transmitting, by the processing hardware to the DU, a message including the PUR configuration; and receiving, by the processing hardware from the DU, a response message.

24. The method according to any of the aspects 21-23, wherein the PUR configuration request message includes PUR related information, and generating the PUR configuration includes generating, by the processing hardware, the PUR configuration based on the PUR related information.

25. The method according to any of the aspects 21-24, further comprising: transmitting, by the processing hardware to the DU, a PUR request message; and receiving, by the processing hardware from the DU, a response message including the PUR configuration.

26. The method according to any of the aspects 21-25, wherein transmitting the release message includes transmitting, by the processing hardware to the DU, a release command message including the release message.

27. The method according to any of the aspects 21-26, wherein transmitting the release message includes transmitting, by the processing hardware to the DU, a modification request message including the release message.

28. The method according to any of the aspects 21-27, wherein transmitting the release message includes transmitting, by the processing hardware to the DU, a radio resource transfer message including the release message.

29. The method according to any of the aspects 21-28, wherein the PUR configuration is valid according to one or more conditions, and further comprising: in response to determining that at least one of the one or more conditions is not satisfied, transmitting, by the processing hardware to the DU, a message instructing the DU to release the PUR configuration.

30. The method according to any of the aspects 21-29, wherein the DU is a first DU, the UE communicates with a second DU in the base station in addition to the first DU, the PUR configuration is a first PUR configuration for the first DU, and further comprising: receiving, by the processing hardware, a PUR configuration request message from the second DU while the UE and the base station are in the connected state; and obtaining, by the processing hardware, a second PUR configuration for the second DU; wherein generating the release message includes generating, by the processing hardware, the release message including the first PUR configuration and the second PUR configuration; and transmitting the release message includes transmitting, by the processing hardware, the release message to the UE via the first DU.

31. The method according to any of the aspects 21-30, wherein obtaining the second PUR configuration includes: generating, by the processing hardware, the second PUR configuration.

32. The method according to any of the aspects 21-31, wherein obtaining the second PUR configuration includes: transmitting, by the processing hardware to the second DU, a PUR request message; and receiving, by the processing hardware from the second DU, a response message including the second PUR configuration.

33. The method according to any of the aspects 21-32, wherein transmitting the release message includes transmitting, by the processing hardware to the first DU, a release command message including the release message.

34. The method according to any of the aspects 21-33, wherein transmitting the release message includes transmitting, by the processing hardware to the first DU, a modification request message including the release message.

35. The method according to any of the aspects 21-34, wherein transmitting the release message includes transmitting, by the processing hardware to the first DU, a radio resource transfer message including the release message.

36. The method according to any of the aspects 21-35, wherein the DU is in a first base station, the UE communicates with a second base station in addition to the first base station, the PUR configuration is a first PUR configuration for the first base station, and further comprising: transmitting, by the processing hardware to the second base station while the UE and the second base station are in the connected state, a request message to request a second PUR configuration for the second base station; and receiving, by the processing hardware from the second base station, the second PUR configuration for the second base station, wherein generating the release message includes generating, by the processing hardware, the release message including the first PUR configuration and the second PUR configuration.

37. The method according to any of the aspects 21-36, further comprising: determining, by the processing hardware, whether the release message includes the PUR configuration; in a first instance, in response to determining that the release message includes the PUR configuration, transmitting, by the processing hardware to the DU, an interface message including the release message; and in a second instance, in response to determining that the release message does not include the PUR configuration, transmitting, by the processing hardware to the DU, a release command message including the release message.

38. A CU of a base station comprising processing hardware and configured a method according to any of the aspect 21-37.

39. A method in a UE for early data transmissions to a base station, the method comprising: receiving, by processing hardware from a distributed unit (DU) of the base station, a preconfigured uplink resource (PUR) configuration in a release message that instructs the UE to transition to an inactive state; and while the UE is in the inactive state, transmitting, by the processing hardware to the DU, a data packet via a PUR resource configured in the PUR configuration.

40. The method according to aspect 39, further comprising: transmitting, by the processing hardware to the DU, a PUR configuration request message while the UE and the base station are in a connected state.

41. The method according to either one of aspect 39 or aspect 40, wherein the PUR configuration request message includes PUR related information.

42. The method according to any of the aspects 39-41, wherein the PUR configuration is valid according to one or more conditions, and further comprising: in response to determining that at least one of the one or more conditions is not satisfied, releasing, by the processing hardware, the PUR configuration.

43. The method according to any of the aspects 39-42, further comprising: transmitting, by the processing hardware, a release notification message to the DU indicating that the PUR configuration has been released.

44. The method according to any of the aspects 39-43, wherein the DU is a first DU, the UE communicates with a second DU in the base station in addition to the first DU, the PUR configuration is a first PUR configuration for the first DU, and wherein receiving the release message includes receiving, by the processing hardware from the first DU, the release message including the first PUR configuration and a second PUR configuration for the second DU.

45. The method according to any of the aspects 39-44, wherein the PUR resource is a first PUR resource and further comprising: transmitting, by the processing hardware to the second DU, a data packet via a second PUR resource configured in the second PUR configuration.

46. The method according to any of the aspects 39-45, wherein the DU is in a first base station, the UE communicates with a second base station in addition to the first base station, the PUR configuration is a first PUR configuration for the first base station, and wherein receiving the release message includes receiving, by the processing hardware from the DU, the release message including the first PUR configuration and a second PUR configuration for the second base station.

47. The method according to any of the aspects 39-46, wherein the PUR resource is a first PUR resource and further comprising: transmitting, by the processing hardware to the second base station, a data packet via a second PUR resource configured in the second PUR configuration.

48. The method according to any of the aspects 39-47, further comprising:

transitioning, by the processing hardware, to the inactive state in response to the release message.

49. The method according to any of the aspects 39-48, wherein the PUR configuration is associated with one or more cells, and further comprising: determining, by the processing hardware, whether a current serving cell for the UE is included in the one or more cells; in a first instance, in response to determining that the current serving cell for the UE is included in the one or more cells, transmitting, by the processing hardware to the DU, the data packet via the PUR resource configured in the PUR configuration; and in a second instance, in response to determining that the current serving cell for the UE is not included in the one or more cells, performing, by the processing hardware, a random access procedure with the base station.

50. The method according to any of the aspects 39-49, further comprising: in response to performing the random access procedure, determining, by the processing hardware, whether early data transmission is allowed in the current serving cell; in a first instance, in response to determining that early data transmission is allowed in the current serving cell, transmitting, by the processing hardware to the DU, the data packet in the random access procedure; and in a second instance, in response to determining that early data transmission is not allowed in the current serving cell: transmitting, by the processing hardware to the DU, a radio resource message in the random access procedure to transition to the connected state; and transmitting, by the processing hardware to the DU, the data packet while operating in the connected state.

51. The method according to any of the aspects 39-50, wherein the PUR configuration is associated with one or more physical or logical resources, and further comprising: determining, by the processing hardware, whether the data packet is associated with a physical or logical resource in the one or more physical or logical resources; in a first instance, in response to determining that the data packet is associated with a physical or logical resource in the one or more physical or logical resources, transmitting, by the processing hardware to the DU, the data packet via the PUR resource configured in the PUR configuration; and in a second instance, in response to determining that the data packet is not associated with a physical or logical resource in the one or more physical or logical resources, performing, by the processing hardware, a random access procedure with the base station.

52. The method according to any of the aspects 39-51, further comprising: in response to performing the random access procedure, determining, by the processing hardware, whether the physical or logical resource associated with the data packet is configured for early data transmission; in a first instance, in response to determining that the physical or logical resource associated with the data packet is configured for early data transmission, transmitting, by the processing hardware to the DU, the data packet in the random access procedure; and in a second instance, in response to determining that the physical or logical resource associated with the data packet is not configured for early data transmission: transmitting, by the processing hardware to the DU, a radio resource message in the random access procedure to transition to the connected state; and transmitting, by the processing hardware to the DU, the data packet while operating in the connected state.

53. The method according to any of the aspects 39-52, further comprising: determining, by the processing hardware, whether the PUR resource is available at a time when the UE is transmitting the data packet; in a first instance, in response to determining that the PUR resource is available at the time when the UE is transmitting the data packet, transmitting, by the processing hardware to the DU, the data packet via the PUR resource configured in the PUR configuration; and in a second instance, in response to determining that the PUR resource is not available at the time when the UE is transmitting the data packet, performing, by the processing hardware, a random access procedure with the base station.

54. The method according to any of the aspects 39-53, further comprising: in response to determining that the PUR resource is not available at the time when the UE is transmitting the data packet: refraining, by the processing hardware, from performing the random access procedure with the base station; and waiting, by the processing hardware, to transmit the data packet until a time when the PUR resource is available.

55. The method according to any of the aspects 39-54, wherein the data packet is available at a first time and further comprising: determining, by the processing hardware, that the PUR resource is available at a second time after the first time; determining, by the processing hardware, whether a length of time between the second time and the first time is within a threshold time period; in a first instance, in response to determining that the length of time is within the threshold time period, transmitting, by the processing hardware to the DU at the second instance in time, the data packet via the PUR resource configured in the PUR configuration; and in a second instance, in response to determining that the length of time is not within the threshold time period, performing, by the processing hardware, a random access procedure with the base station.

56. A UE comprising processing hardware and configured a method according to any of aspects 39-55.

The following description may be applied to the description above.

In some implementations, "message" is used and can be replaced by "information element (IE)". In some implementations, "IE" is used and can be replaced by "field". In some implementations, "configuration" can be replaced by "configurations" or the configuration parameters.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method in a distributed unit (DU) of a base station for processing early data transmissions from a user equipment (UE), the method comprising:

receiving, by the DU, a context request message from a central unit (CU) of the base station, the context request message including an indication to request a preconfigured uplink resource (PUR) configuration;

transmitting, by the DU to the CU, a response message including the PUR configuration;

receiving, by the DU, a UE release command message from the CU including the PUR configuration;

transmitting, by the DU, the PUR configuration to the UE in a release message that instructs the UE to transition to an inactive state, wherein the DU transmits the release message to the UE in response to receiving the UE release command message from the CU;

retaining, by the DU, the PUR configuration; and while the UE is in the inactive state, receiving, by the DU from the UE, a data packet via a PUR resource configured in the PUR configuration.

2. The method of claim 1, further comprising:

receiving, by the DU, a PUR configuration request message from a UE while the UE and the base station are in a connected state; and transmitting, by the DU, the PUR configuration request message to the CU.

3. The method of claim 1, wherein the PUR configuration is valid according to one or more conditions, and further comprising:

in response to determining that at least one of the one or more conditions is not satisfied, releasing, by the DU, the PUR configuration.

4. The method of claim 3, wherein the one or more conditions includes the PUR configuration being valid for a period of time, and further comprising:

indicating, to the CU, the period of time in an information element.

5. A distributed unit (DU) of a base station comprising:

memory; and processing hardware coupled to the memory, the processing hardware and configured to:

receive a context request message from a central unit (CU) of the base station, the context request message including an indication to request a preconfigured uplink resource (PUR) configuration;

transmit, to the CU, a response message including the PUR configuration;

receive a UE release command message from the CU including the PUR configuration;

transmit the PUR configuration to the UE in a release message that instructs the UE to transition to an inactive state, wherein the DU transmits the release message to the UE in response to receiving the UE release command message from the CU;

retain the PUR configuration; and while the UE is in the inactive state, receive, from the UE, a data packet via a PUR resource configured in the PUR configuration.

6. The DU of claim 5, wherein the PUR configuration is valid according to one or more conditions, and the processing hardware is further configured to:

in response to determining that at least one of the one or more conditions is not satisfied, release the PUR configuration.

7. The DU of claim 6, wherein the one or more conditions includes the PUR configuration being valid for a period of time, and the processing hardware is further configured to:

indicate, to the CU, the period of time in an information element.

8. A method in a UE for early data transmissions to a base station, the method comprising:

receiving, by the UE from a distributed unit (DU) of the base station, a preconfigured uplink resource (PUR) configuration, which is retained at the DU and received in a UE release command message from a central unit (CU) of the base station, in a release message that instructs the UE to transition to an inactive state, wherein the release message is received in response to the DU receiving the UE release command message from the CU; and while the UE is in the inactive state, transmitting, by the UE to the DU, a data packet via a PUR resource configured in the PUR configuration.

9. The method of claim 8, further comprising:

transmitting, by the UE to the DU, a PUR configuration request message while the UE and the base station are in a connected state, and wherein the PUR configuration request message includes PUR related information.

10. The method of claim 8, wherein the PUR configuration is valid according to one or more conditions, and further comprising:

in response to determining that at least one of the one or more conditions is not satisfied, releasing, by the UE, the PUR configuration.

11. The method of claim 10, wherein the UE releases the PUR configuration after a period of time has passed.

12. The method of claim 8, further comprising:

transitioning, by the UE, to the inactive state in response to the release message.

13. A user equipment (UE) comprising:

memory; and processing hardware coupled to the memory and configured to:

receive, from a distributed unit (DU) of a base station, a preconfigured uplink resource (PUR) configuration, which is retained at the DU and received in a UE release command message from a central unit (CU) of the base station, in a release message that instructs the UE to transition to an inactive state, wherein the release message is received in response to the DU receiving the UE release command message from the CU; and while the UE is in the inactive state, transmit, to the DU, a data packet via a PUR resource configured in the PUR configuration.

14. The UE of claim 13, wherein the PUR configuration is valid according to one or more conditions, and the processing hardware is further configured to:

in response to a determination that at least one of the one or more conditions is not satisfied, release the PUR configuration.

15. The UE of claim 14, wherein the processing hardware is configured to release the PUR configuration after a period of time has passed.

16. The UE of claim 13, wherein the processing hardware is further configured to:

transition to the inactive state in response to the release message.

* * * * *